(12) United States Patent
Dole

(10) Patent No.: US 10,960,450 B2
(45) Date of Patent: Mar. 30, 2021

(54) PIPE GROOVING DEVICE

(71) Applicant: Victaulic Company, Easton, PA (US)

(72) Inventor: Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 100 days.

(21) Appl. No.: 16/214,494

(22) Filed: Dec. 10, 2018

(65) Prior Publication Data

US 2019/0184441 A1 Jun. 20, 2019

Related U.S. Application Data

(60) Provisional application No. 62/717,086, filed on Aug. 10, 2018, provisional application No. 62/607,340, filed on Dec. 19, 2017.

(51) Int. Cl.
| | | |
|---|---|---|
| *B21D 17/04* | (2006.01) | |
| *F16H 53/02* | (2006.01) | |
| *F16H 1/28* | (2006.01) | |
| *B21H 1/18* | (2006.01) | |

(52) U.S. Cl.
CPC .............. *B21D 17/04* (2013.01); *B21H 1/18* (2013.01); *F16H 1/28* (2013.01); *F16H 53/025* (2013.01)

(58) Field of Classification Search
CPC ... B21B 17/00; B21B 17/02; B21B 2023/005; B21D 17/00; B21D 17/04; B21H 1/18; B21C 37/20; B21C 37/025; F16H 1/28; F16H 53/025
See application file for complete search history.

(56) References Cited

U.S. PATENT DOCUMENTS

| | | | |
|---|---|---|---|
| 63,364 A | 4/1867 | Cochrane | |
| 412,626 A | 10/1889 | Jones | |
| 1,414,668 A | 5/1922 | Reed | |
| 2,004,816 A | 6/1935 | Lindgren | |
| 2,089,475 A | 8/1937 | Grotnes | |
| 2,679,089 A * | 5/1954 | Herward | ................. B21K 1/30 72/126 |

(Continued)

FOREIGN PATENT DOCUMENTS

| | | |
|---|---|---|
| EP | 1038603 | 9/2000 |
| TW | 291451 | 11/1996 |

OTHER PUBLICATIONS

Author Unknown; Reliable—ESFR Pendent Sprinklers; www.reliablesprinkler.com; Bulletin 019 Jun. 2020; 5 pages.

(Continued)

*Primary Examiner* — Edward T Tolan
(74) *Attorney, Agent, or Firm* — Ballard Spahr LLP

(57) ABSTRACT

A device for forming circumferential grooves in pipe elements uses multiple geared cam bodies mounted on a carriage which rotates about a fixed pinion. The gears engage with the pinion which causes the geared cam bodies to rotate relative to the carriage. Traction surfaces and cam surfaces on the cam bodies traverse the outer surface of the pipe element and impress a circumferential groove therein. To substantially prevent rotation of the pipe element the pitch circle diameter of the pinion equals the outer diameter of the pipe element and the pitch circle diameters of the traction surfaces equal the pitch circle diameters of the gears.

25 Claims, 16 Drawing Sheets

(56) References Cited

U.S. PATENT DOCUMENTS

| | | | | |
|---|---|---|---|---|
| 2,684,101 | A | * | 7/1954 | Clerke .................. B21H 3/042 72/115 |
| 2,686,442 | A | | 10/1957 | Ogle |
| 2,821,099 | A | * | 1/1958 | Beecher .................. B21H 7/00 72/99 |
| 2,942,567 | A | * | 6/1960 | Kargard ................ B21D 41/04 72/115 |
| 3,260,089 | A | * | 7/1966 | Hazelton ................ B21D 17/04 72/117 |
| 3,260,090 | A | * | 7/1966 | Sofranko .................. B21C 3/12 72/126 |
| 3,277,684 | A | | 10/1966 | Gareri |
| 3,299,680 | A | | 1/1967 | Thompson |
| 3,383,892 | A | * | 5/1968 | Brothen ................ B21C 37/205 72/98 |
| 3,473,359 | A | | 10/1969 | Joslin |
| 3,564,887 | A | * | 2/1971 | Novak .................. B21C 37/207 72/77 |
| 3,717,017 | A | * | 2/1973 | Vukovich ................ B21H 5/02 72/68 |
| 4,018,462 | A | | 4/1977 | Saka |
| 4,043,161 | A | * | 8/1977 | Toma .................... B21D 15/06 72/78 |
| 4,143,535 | A | | 3/1979 | Bouman |
| 4,173,877 | A | | 11/1979 | Kreiskorte |
| 4,389,875 | A | | 6/1983 | Grotnes, II |
| 4,660,803 | A | | 4/1987 | Johnston et al. |
| 4,838,066 | A | * | 6/1989 | Marcon .................. B21D 17/04 72/95 |
| 5,002,318 | A | | 3/1991 | Witter |
| 5,040,729 | A | | 8/1991 | Carrozza |
| 5,291,769 | A | | 3/1994 | Miyano |
| 5,435,213 | A | | 7/1995 | Buck |
| 6,145,892 | A | | 11/2000 | Weber |
| 6,257,627 | B1 | | 7/2001 | Fujiwara et al. |
| 6,272,895 | B1 | | 8/2001 | Hamm |
| 6,338,263 | B1 | | 1/2002 | Obata et al. |
| 6,547,785 | B1 | | 4/2003 | Kayayama et al. |
| 6,776,018 | B2 | | 8/2004 | Hamm et al. |
| 6,968,719 | B2 | | 11/2005 | Zifferer |
| 6,976,712 | B2 | | 12/2005 | Lukach, Jr. |
| 7,997,112 | B2 | | 8/2011 | Sandman et al. |
| 9,003,851 | B2 | | 4/2015 | Obata et al. |
| 2002/0007514 | A1 | | 1/2002 | Dole et al. |
| 2003/0226387 | A1 | | 12/2003 | Dole et al. |
| 2004/0221635 | A1 | | 11/2004 | Bauder |
| 2005/0178179 | A1 | | 8/2005 | Dole |
| 2006/0011017 | A1 | | 1/2006 | Kathan |
| 2008/0012326 | A1 | | 1/2008 | Braathen et al. |
| 2017/0151596 | A1 | | 6/2017 | Dole |

OTHER PUBLICATIONS

Author Unknown; Tyco—Model K-17-231—Upright and Pendent Sprinklers; www.tyco-fire.com; TFP332—Aug. 2018; 4 pages.

Author Unknown; Tyco—Model ESFR-25—25.2 K-factor Pendent Sprinkler; www.tyco-fire.com; TFP312—Mar. 2020; 6 pages.

Author Unknown; Victaulic—Firelock V47, K16.8; Model 4702 Early Suppression Fast Response; www.victaulic.com; 40.89—Victaulic Company 2019; 5 pages.

Author Unknown; Victaulic—LP-46 Low Pressure Storage Sprinkler; Model V4601, K25, Storage Pendent Sprinkler; www.victaulic.com; 40.95—Victaulic Company 2018; 9 pages.

* cited by examiner

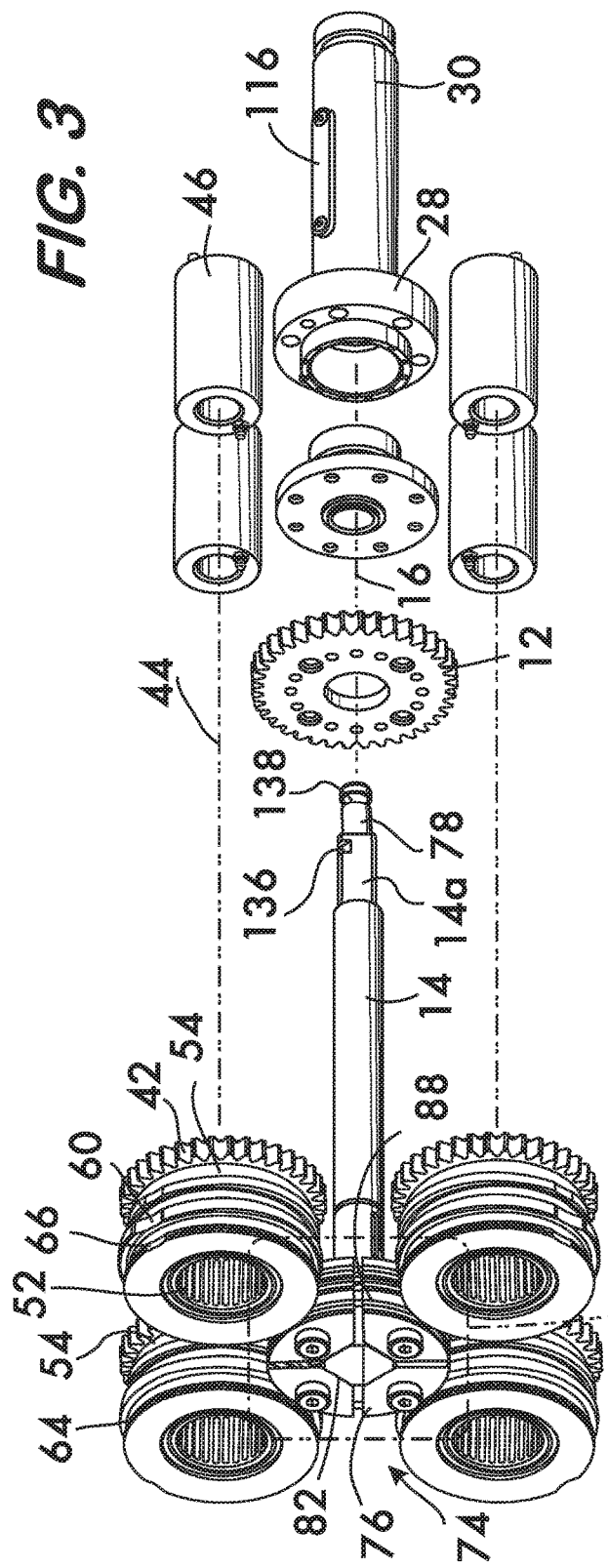
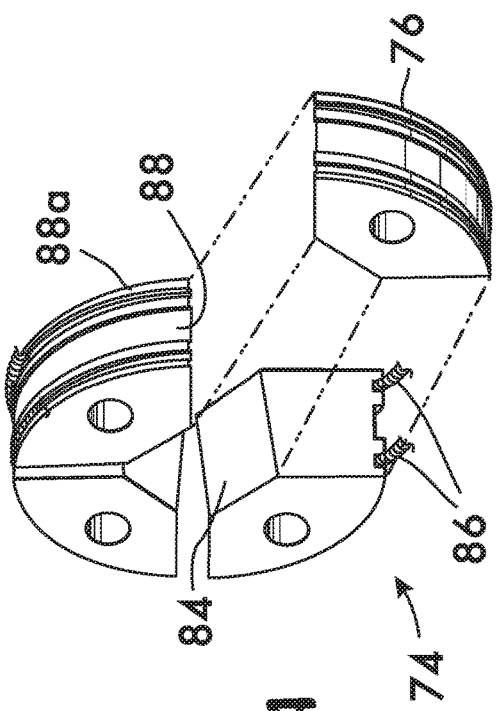
FIG. 3
FIG. 3A

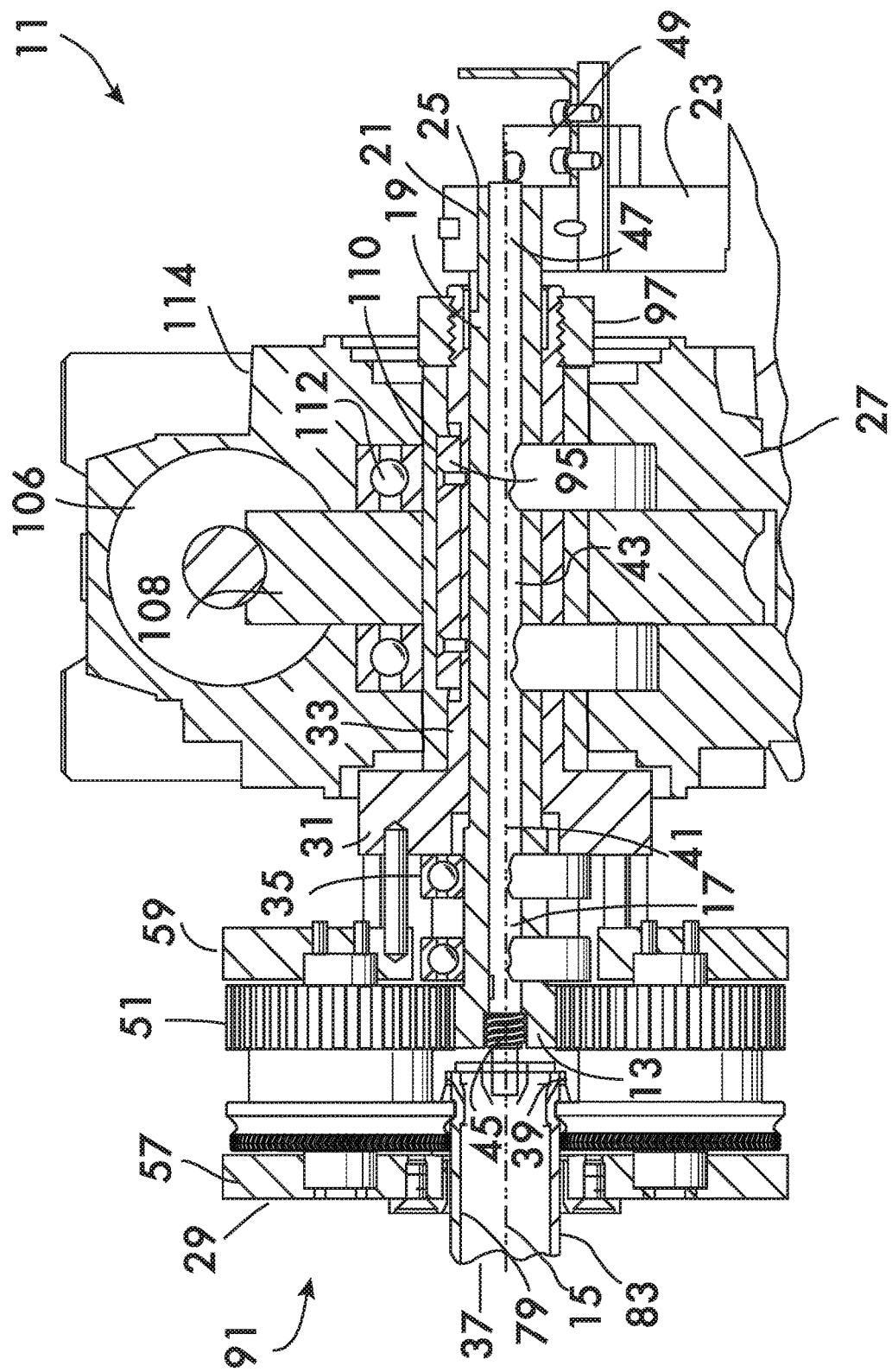

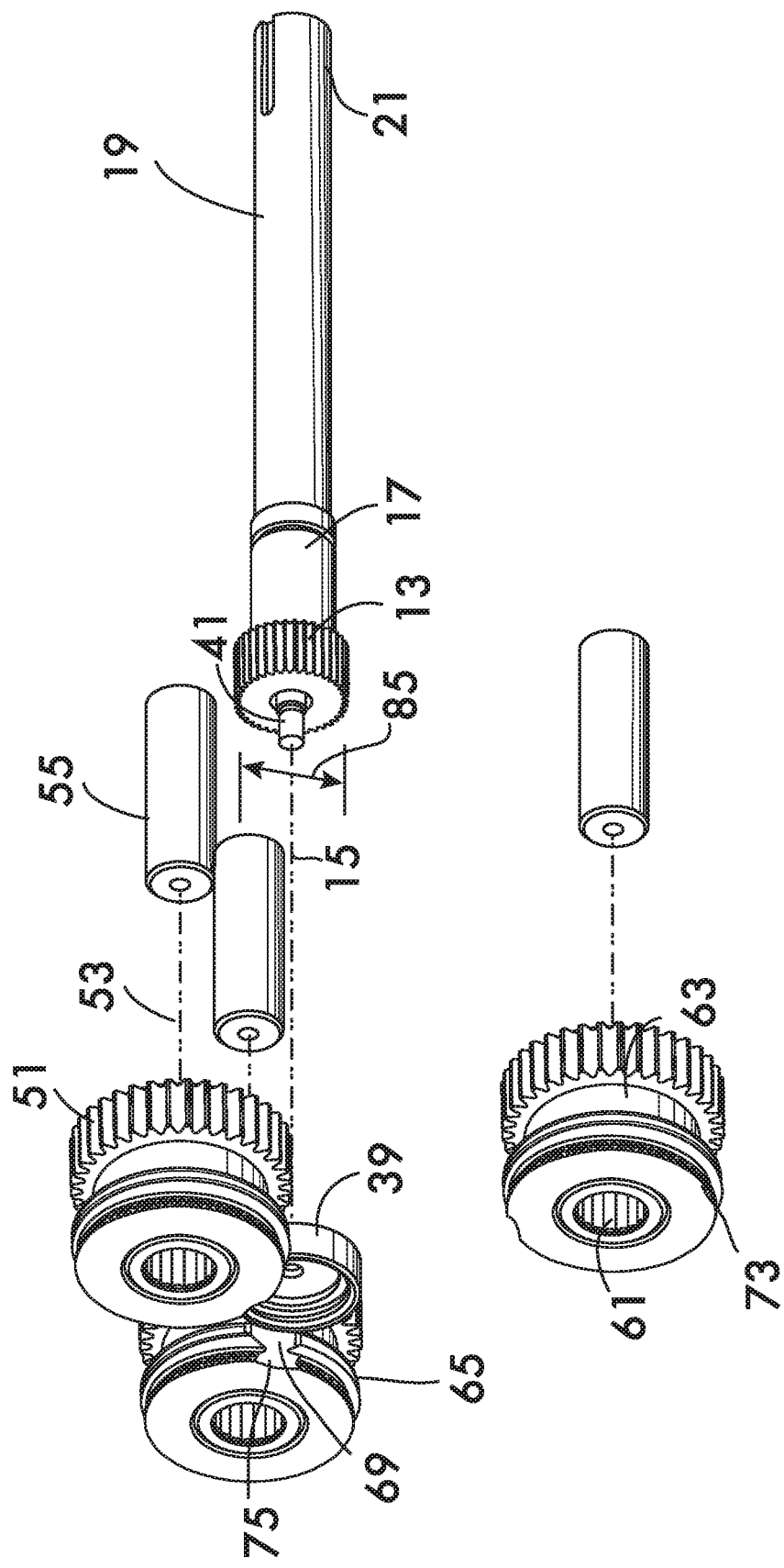

PIPE GROOVING DEVICE

CROSS REFERENCE TO RELATED APPLICATIONS

This application is based upon and claims benefit of priority to U.S. Provisional Application No. 62/607,340, filed Dec. 19, 2017, and U.S. Provisional Application No. 62/717,086, filed Aug. 10, 2018, both of these applications being hereby incorporated by reference herein.

FIELD OF THE INVENTION

This invention relates to machines using cams to cold work pipe elements.

BACKGROUND

Cold working of pipe elements, for example, impressing a circumferential groove in a pipe element to accept a mechanical pipe coupling, is advantageously accomplished using roll grooving machines having an inner roller which engages an inside surface of the pipe element and an outer roller which simultaneously engages an outside surface of the pipe element opposite to the inner roller. As the pipe is rotated about its longitudinal axis, often by driving the inner roller, the outer roller is progressively forced toward the inner roller. The rollers have surface profiles which are impressed onto the pipe element circumference as it rotates, thereby forming a circumferential groove.

There are various challenges which this technique faces if it is to cold work pipe elements with the required tolerances to the necessary precision. Most pressing are the difficulties associated with producing a groove of the desired radius (measured from the center of the pipe element bore to the floor of the groove) within a desired tolerance range. Additionally, impressing a circumferential groove near the end of a pipe element often causes the end region of the pipe element to expand in diameter, a phenomenon known as "flare". Flare and pipe element tolerances must be accounted for in the design of mechanical couplings and seals and this complicates their design and manufacture. These considerations have resulted in complicated prior art devices which, for example, require actuators for forcing the rollers into engagement with the pipe element and the need for the operator to adjust the roller travel to achieve the desired groove radius. Additionally, prior art roll grooving machines apply significant torque to the pipe element and have low production rates, often requiring many revolutions of the pipe element to achieve a finished circumferential groove. There is clearly a need for devices, for example, those using cams, to accurately cold work pipe elements which are simple yet produce faster results with less operator involvement.

SUMMARY

The invention concerns a device for forming a circumferential groove in a pipe element. In one example embodiment the device comprises a pinion fixed against rotation about a pinion axis arranged coaxially with the pinion. An expanding die is positioned adjacent to the pinion and concentric with the pinion axis. The expanding die has a plurality of die segments movable radially toward and away from the pinion axis. Each die segment has a die face facing away from the pinion axis and engageable with an inner surface of the pipe element when moved away therefrom. An actuator is coupled to the expanding die for moving the die segments toward and away from the pinion axis. A carriage surrounds the expanding die. The carriage is rotatable about the pinion axis. The carriage defines an opening arranged coaxially with the pinion axis for receiving the pipe element. A plurality of gears are mounted on the carriage. Each gear is rotatable relatively to the carriage about a respective gear axis. Each gear engages with the pinion. One of a plurality of cam bodies are each mounted on a respective one of the gears. One of a plurality of first cam surfaces extend around a respective one of the cam bodies. Each one of the first cam surfaces comprises a region of increasing radius and a discontinuity. The pipe element is positioned between the die faces and the first cam surfaces when the pipe element is received within the opening.

In an example embodiment the actuator comprises a draw bar positioned coaxially with the expanding die and movable along the pinion axis. Motion of the draw bar moves the die segments toward and away from the pinion axis. A cylinder has a piston coupled to the draw bar for moving the draw bar along the pinion axis.

By way of example, each the gear may have a same pitch circle diameter. At least one traction surface may extend around one of the cam bodies. The at least one traction surface is engageable with the pipe element. Further by way of example the pinion may have a pitch circle diameter equal to an outer diameter of the pipe element.

In an example embodiment, at least one traction surface extends around one of the cam bodies. The at least one traction surface is engageable with the pipe element. The at least one traction surface has a pitch circle diameter equal to a pitch circle diameter of one of the gears.

In an example, each one of the first cam surfaces further comprises a region of constant radius positioned adjacent to a respective one of the discontinuities.

By way of example, the at least one traction surface has a gap therein, the gap being aligned axially with the discontinuity of the first cam surface surrounding the one cam body. Additionally by example, the at least one traction surface has a gap therein, the gap being aligned axially with the discontinuity of the first cam surface surrounding the one cam body.

An example embodiment further comprises a plurality of the traction surfaces. Each one of the traction surfaces extends around a respective one of the cam bodies. Each one of the traction surfaces has a gap therein. Each gap is aligned axially with a respective one of the discontinuities of the first cam surfaces on each one of the cam bodies. In an example, the at least one traction surface is positioned on the one cam body in spaced relation to the first cam surface extending around the one cam body. In a further example, the at least one traction surface is positioned on the one cam body in spaced relation to the first cam surface extending around the one cam body.

An example embodiment may comprise at least three gears. Another example embodiment may comprise at least four gears. Further by way of example, one of the first cam surfaces is positioned between the gear and the at least one traction surface. In another example, one of the first cam surfaces is positioned proximate to the at least one traction surface. In an example embodiment, the at least one traction surface comprises a plurality of projections extending outwardly therefrom.

An example embodiment further comprises a plurality of second cam surfaces. Each one of the second cam surfaces extends around a respective one of the cam bodies and is positioned in spaced relation to a respective one of the first cam surfaces. Each one of the second cam surfaces may comprise a region of increasing radius and a discontinuity. Each discontinuity of the second cam surfaces is aligned with a respective one of the discontinuities of the first cam surfaces. Further by way of example, each one of the second cam surfaces may comprise a region of constant radius positioned adjacent to a respective one of the discontinuities of the second cam surfaces. In another example embodiment, each one of the second cam surfaces has a constant radius.

An example embodiment further comprises at least one traction surface extending around one of the cam bodies. The at least one traction surface has a gap therein. The gap is aligned axially with the discontinuity of the first cam surface surrounding the one cam body. In a further example, the at least one traction surface comprises a plurality of projections extending outwardly therefrom. In an example embodiment the first cam surface surrounding the one cam body is positioned between the at least one traction surface and the second cam surface surrounding the one cam body.

In an example embodiment, the first and the second cam surfaces surrounding the one cam body are positioned between the at least one traction surface and one of the gears on which the one cam body is mounted. In a further example, the first cam surface surrounding the first cam body is positioned proximate to the at least one traction surface. The at least one traction surface may have a pitch circle diameter equal to a pitch circle diameter of one of the gears. An example further comprises a plurality of traction surfaces. Each one of the traction surfaces extends around a respective one of the cam bodies. Each one of the traction surfaces has a gap therein. Each gap is aligned axially with a respective one of the discontinuities of the first cam surfaces on each one of the cam bodies. Each one of the traction surfaces may comprise a plurality of projections extending outwardly therefrom.

In another example embodiment, each one of the first cam surfaces is positioned between a respective one of the traction surfaces and a respective one of the second cam surfaces on each cam body. The first and second cam surfaces may be positioned between the traction surface and the gear on each the cam body. The first cam surface may be positioned proximate to the traction surface on each cam body.

The invention encompasses another example device for forming a circumferential groove in a pipe element. In this example the device comprises a pinion fixed against rotation about a pinion axis arranged coaxially with the pinion. A carriage surrounds the pinion. The carriage is rotatable about the pinion axis and defines an opening arranged coaxially with the pinion axis for receiving the pipe element. A plurality of gears are mounted on the carriage. Each gear is rotatable relatively to the carriage about a respective gear axis. Each gear engages with the pinion. A plurality of cam bodies, of which each cam body is mounted on a respective one of the gears, include a plurality of first cam surfaces. Each one of the first cam surfaces extend around a respective one of the cam bodies and is engageable with the pipe element received within the opening. Each one of the first cam surfaces comprises a region of increasing radius. Each one of the first cam surfaces comprises a first discontinuity of the first cam surface. In an example, each gear has a same pitch circle diameter. An example embodiment may further comprise a plurality of second cam surfaces. Each one of the second cam surfaces extends around a respective one of the cam bodies and is positioned in spaced relation to one of the first cam surfaces.

In an example embodiment, each one of the second cam surfaces comprises a second region of increasing radius. Each one of the second cam surfaces comprises a second discontinuity of the second cam surface. The second discontinuity is aligned with the first discontinuity on each cam body. By way of example, each one of the first cam surfaces comprises a region of constant radius positioned adjacent to a respective one of the first discontinuities. In a further example, each one of the second cam surfaces comprises a region of constant radius positioned adjacent to a respective one of the second discontinuities. Each one of the second cam surfaces may have a constant radius. An example embodiment further comprises at least one traction surface extending around one of the cam bodies. The at least one traction surface has a gap therein. The gap is aligned axially with the first discontinuity of the first cam surface surrounding the one cam body.

In an example embodiment, the at least one traction surface may comprise a plurality of projections extending outwardly therefrom. Further by way of example, the at least one traction surface may be positioned proximate to the first cam surface surrounding the one cam body. In another example, the pinion has a pitch circle diameter equal to an outer diameter of the pipe element. In a further example, the at least one traction surface may have a pitch circle diameter equal to a pitch circle diameter of one of the gears.

An example embodiment may further comprise a plurality of traction surfaces. Each one of the traction surfaces extend around a respective one of the cam bodies. Each one of the traction surfaces has a gap therein. Each gap is aligned axially with a respective one of the discontinuities of the first cam surfaces on each one of the cam bodies. Each one of the traction surfaces has a pitch circle diameter equal to the pitch circle diameters of the gears. By way of example, at least one traction surface extends around one of the cam bodies. The at least one traction surface has a gap therein. The gap is aligned axially with the first discontinuity of the first cam surface surrounding the one cam body. By way of example, the pinion has a pitch circle diameter equal to an outer diameter of the pipe element. Also in an example, the at least one traction surface may have a pitch circle diameter equal to a pitch circle diameter of one of the gears. In an example embodiment, the first cam surface may be positioned between the at least one traction surface and the second cam surface surrounding the one cam body. Further by way of example, the first and second cam surfaces may be positioned between the at least one traction surface and the gear on which the one cam body is mounted.

Another example embodiment further comprises a plurality of the traction surfaces. Each one of the traction surfaces extends around a respective one of the cam bodies. Each one of the traction surfaces has a gap therein. Each gap is aligned axially with a respective one of the discontinuities of the first cam surfaces on each one of the cam bodies. Each one of the traction surfaces has a pitch circle diameter equal to the pitch circle diameters of the gears. By way of example, each one of the first cam surfaces may be positioned between a respective one of the traction surfaces and a respective one of the second cam surfaces on each the cam body. In a further example, each one of the first and second cam surfaces may be positioned between the respective one of the traction surface and a respective one of the gears on each the cam body. Also by way of example, each one of the first cam surfaces may positioned proximate to a respective one of the traction surfaces on each the cam body.

An example embodiment may comprise at least three gears. An example embodiment may comprise at least four gears. An example embodiment may further comprise a cup positioned adjacent to the pinion and facing the opening. The pipe element abuts the cup.

The invention also encompasses a plurality of cams for cold working a pipe element. The cams are rotated circumferentially about the pipe element. By way of example, each cam comprises a cam body having an axis of rotation. A first cam surface extends around the cam body. The first cam surface comprises a first region of increasing radius and a first discontinuity of the first cam surface. A second cam surface extends around the cam body and is positioned in spaced relation along the axis of rotation to the first cam surface. By way of example, the second cam surface may comprise a second region of increasing radius and a second discontinuity of the second cam surface. The second discontinuity is aligned with the first discontinuity. The first cam surface may have a region of constant radius positioned adjacent to the first discontinuity. The second cam surface may have a region of constant radius positioned adjacent to the second discontinuity. In an example embodiment, the second cam surface may have a constant radius.

An example embodiment may further comprise a traction surface extending around the cam body. The traction surface has a gap therein. The gap is aligned axially with the first discontinuity. In an example, the traction surface comprises a plurality of projections extending outwardly therefrom. By way of example, the first cam surface may be positioned between the traction surface and the second cam surface. Another example embodiment comprises a gear mounted on the cam body. The gear is arranged coaxially with the axis of rotation. In an example embodiment, the first and second cam surfaces may be positioned between the traction surface and the gear.

BRIEF DESCRIPTION OF THE DRAWINGS

FIGS. 3 and 3A are exploded isometric views of selected components of the device shown in FIG. 1;

FIG. 10 is a longitudinal sectional view of the device shown in FIG. 9 forming a circumferential groove in a pipe element;

FIG. 11 is an exploded isometric view of selected components of the device shown in FIG. 9;

DETAILED DESCRIPTION

Figure 1:
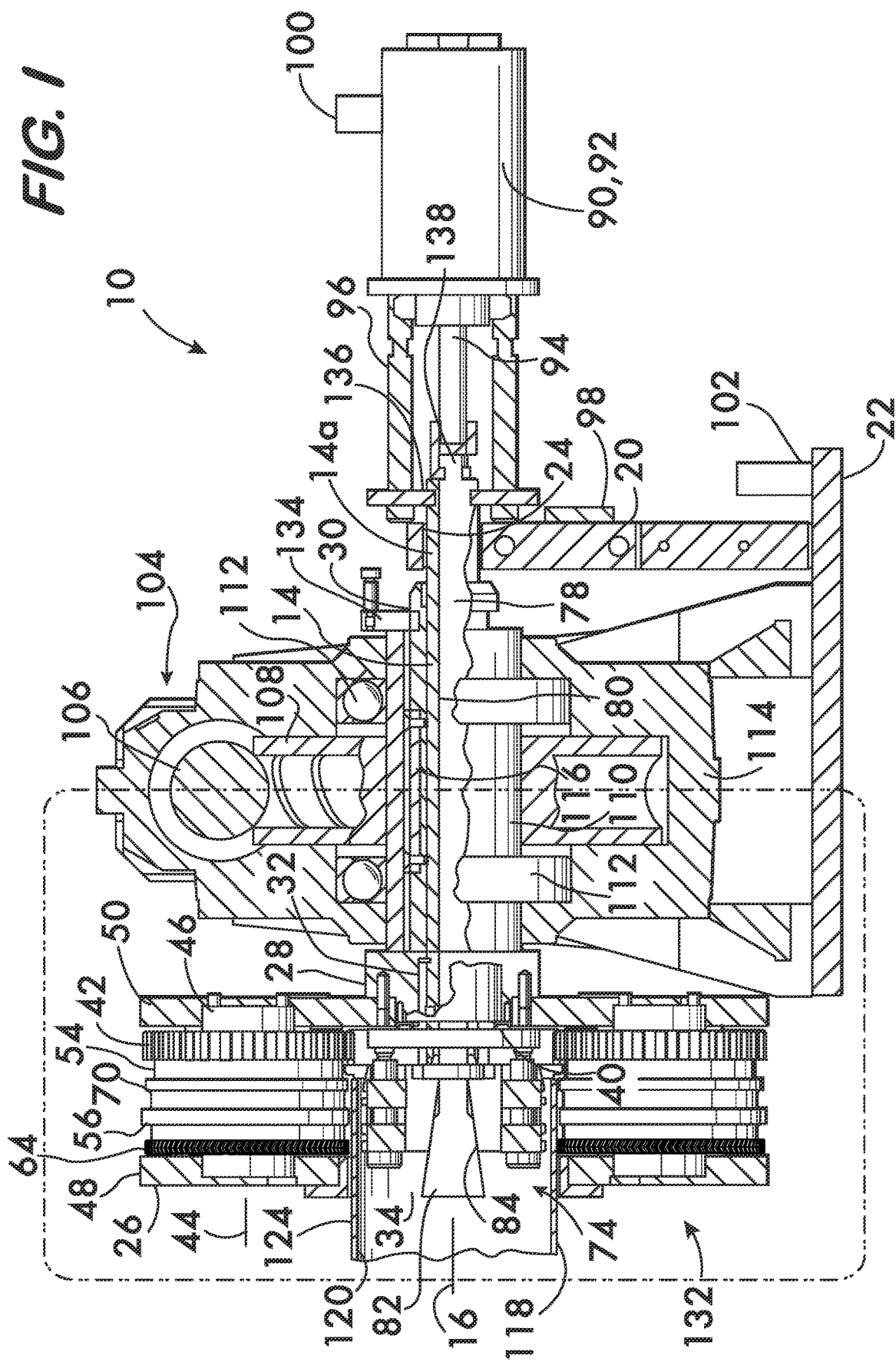
FIG. 1 is a longitudinal sectional view of an example device for forming circumferential grooves in pipe elements.
Figure 1A:
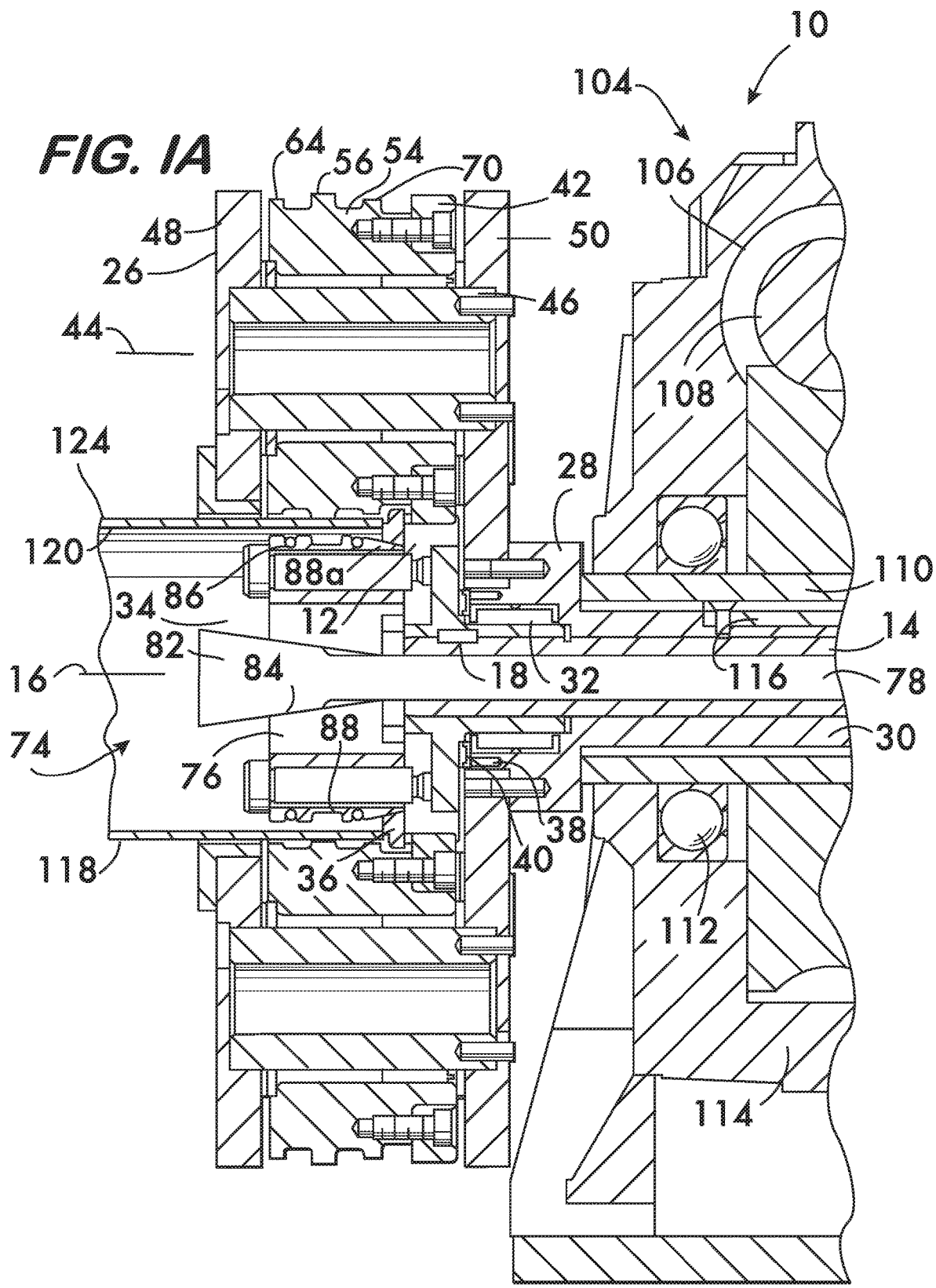
FIG. 1A is a longitudinal sectional view on an enlarged scale of a portion of the device shown in FIG. 1.

FIGS. 1 and 1A show an example device 10 for forming a circumferential groove in a pipe element. Device 10 is advantageous for grooving pipe elements having nominal diameters of 1.25 inches or greater. Device 10 comprises a pinion 12 mounted on an intermediate shaft 14 (see also FIG. 3). Pinion 12 and intermediate shaft 14 are fixedly mounted against rotation about a pinion axis 16 arranged coaxially with the pinion and shaft. Rotational fixity of the pinion 12 is accomplished using a key 18 between the pinion and the intermediate shaft 14 as well as engaging a portion 14a of the intermediate shaft 14 with a fixing mount 20. The fixing mount 20 is fixedly mounted on a base 22. Portion 14a of intermediate shaft 14 has a polygonal cross section which engages an opening 24 which extends through the fixing mount 20. The shape of opening 24 is matched to that of portion 14a of the intermediate shaft 14 and will thus prevent rotation of the shaft about the pinion axis 16 but allow axial motion of the shaft. In this example embodiment, portion 14a has a square cross section and opening 24 has a substantially matching square shape.

A carriage 26 surrounds the pinion 12. Carriage 26 is mounted on the flange 28 of an outer shaft 30. Outer shaft 30 is hollow, surrounds and is coaxial with the intermediate shaft 14. Bearings 32 positioned between the outer shaft 30 and the intermediate shaft 14 permit the outer shaft, and hence the carriage 26 attached thereto, to rotate about the pinion axis 16 relatively to intermediate shaft 14. The carriage 26 defines an opening 34 for receiving a pipe element in which a groove is to be formed. Opening 34 is arranged coaxially with the pinion axis 16. A stop plate 36 is mounted on the intermediate shaft 14 via the pinion 12. Stop plate 36 is movable axially along pinion axis 16 with the intermediate shaft 14 and the pinion 12. The stop plate 36, intermediate shaft 14 and pinion 12 are biased toward the opening 34 by springs 38 acting between the pinion and the outer shaft 30 via the shaft flange 28. Because intermediate shaft 14 is fixed in rotation relatively to the base 22, thrust bearings 40 may be used between pinion 12 and springs 40 to protect the springs 38 which rotate with the flange 28 and the outer shaft 30, and reduce friction between the pinion 12 and the flange 28. The stop plate 36 cooperates with pinion 12 and thrust bearings 40 to provide a positive stop which locates the pipe element for proper positioning of the groove.

A plurality of gears 42 are mounted on the carriage 26. In the example embodiment shown in FIGS. 1, 2 and 3, the carriage has 4 gears spaced at angles of 90° from one another. Each gear 42 is rotatable about a respective gear axis 44. In a practical embodiment, each gear is mounted on a gear shaft 46 fixed between front and rear plates 48 and 50 comprising the carriage 26. Bearings 52 positioned between each gear 42 and its respective shaft 46 provide for low friction rotation of the gears within the carriage 26. Each gear 42 engages with the pinion 12.

Figure 4:
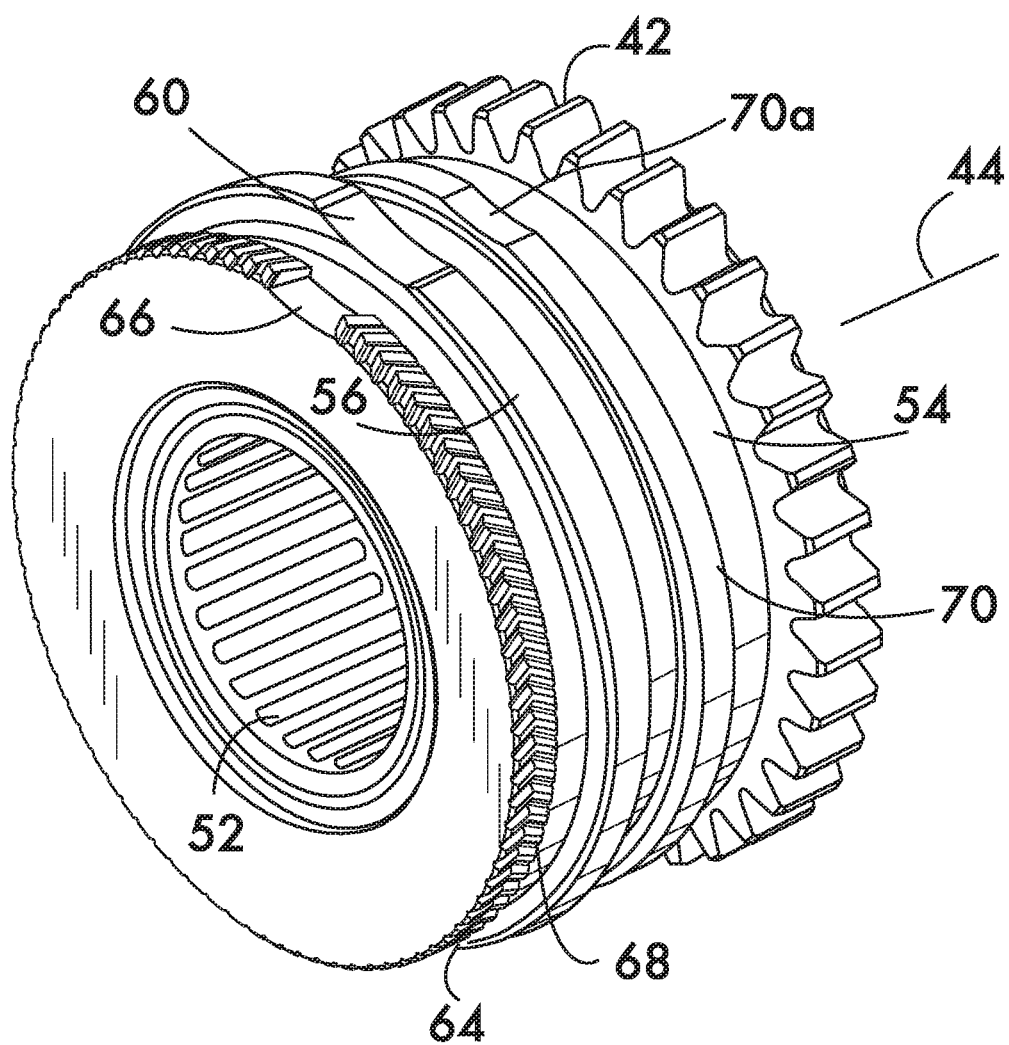
FIG. 4 is an isometric view of an example cam used in the device shown in FIG. 1 on an enlarged scale.
Figure 5:
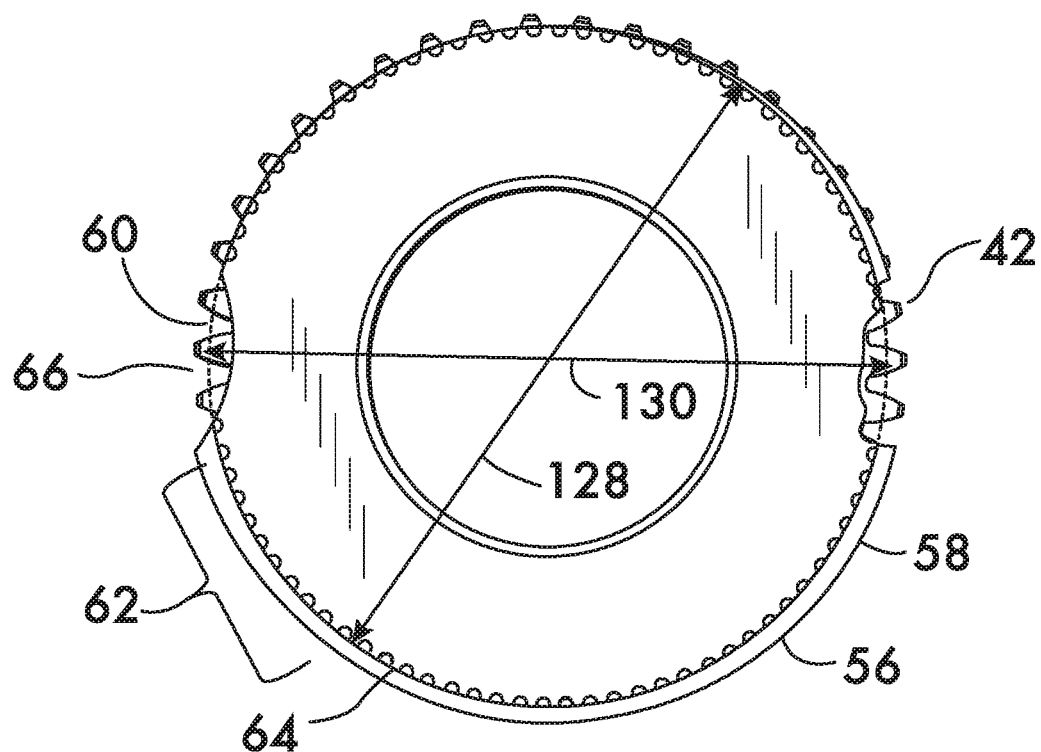
FIG. 5 is an end view of an example cam used in the device shown in FIG. 1 on an enlarged scale.

As shown in FIG. 4, a cam body 54 is mounted on each gear 42. A first cam surface 56 extends around each cam body 54. First cam surfaces 56 are engageable with the pipe element received through the opening 34. As shown in FIG. 5, first cam surface 56 comprises a region of increasing radius 58 and a discontinuity 60 of the cam surface. Discontinuity 60 is a position on the cam body 54 where the cam surface 56 does not contact the pipe element. It is further advantageous to include, as part of each first cam surface 56, a region of constant radius 62 positioned adjacent to the discontinuity 60. At least one traction surface 64 may extend around one of the cam bodies 54. In the example shown in FIG. 3, a respective traction surface 64 extends around each cam body 54. The traction surfaces 64 are also engageable with a pipe element received within the carriage 26, but each traction surface has a gap 66 aligned axially (i.e., in a direction along the gear axis 44) with the discontinuity 60 in the first cam surface 56 on each cam body 54. As shown in FIG. 4, the traction surface 64 may comprise a plurality of projections 68 extending outwardly therefrom. The projections provide purchase between the pipe element and the traction surface 64 during device operation and may be formed, for example, by knurling the traction surface. The traction surface has pitch circle with a diameter 128. When projections 68 are present on traction surface 64, pitch diameter 128 of the traction surface will be determined by the interaction of projections 68 with pipe element 79, including the impression made by the projections 68 upon pipe element 79. If projections 68 are not present, the pitch circle diameter 127 of the traction surface 64 will equal that of the traction surface. As further shown in FIG. 4, the first cam surface 56 is positioned between the gear 42 and the traction surface 64, in spaced relation to the traction surface but proximate to it as compared with the gear.

Figure 6:
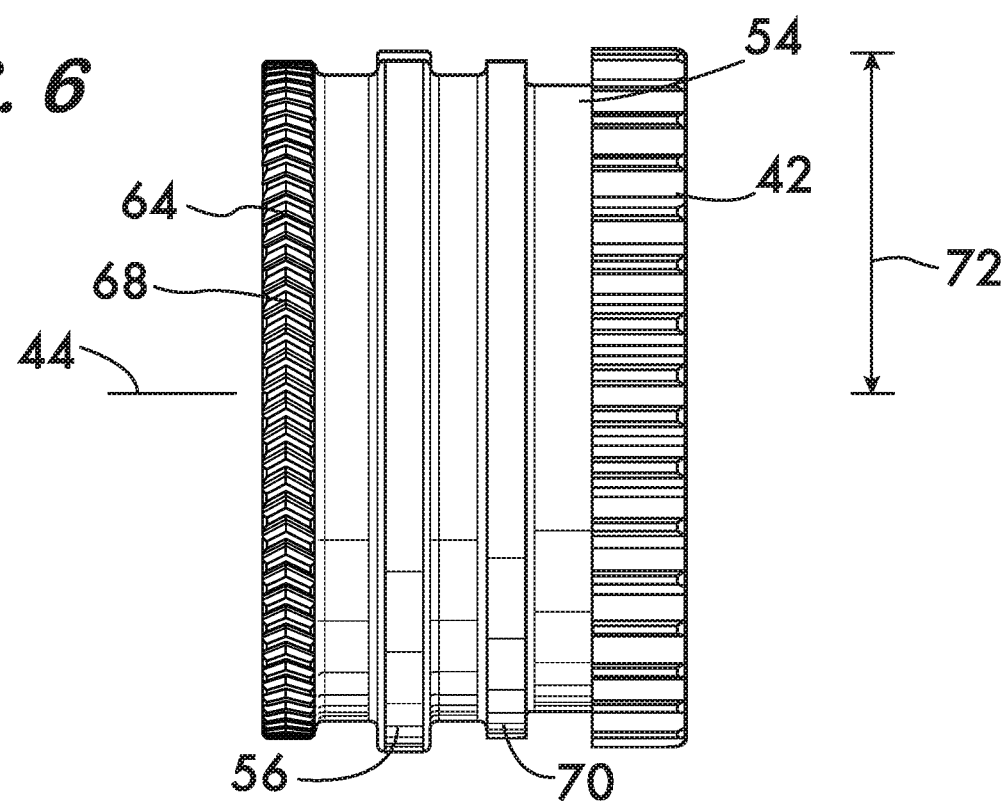
FIG. 6 is a side view of an example cam used in the device shown in FIG. 1 on an enlarged scale.

As shown in FIGS. 1 and 4, a second cam surface 70 is also positioned on the cam body 54 and extends there around. Second cam surface 70 is a controlled flare surface. Flare is the radial expansion of the pipe element's end which tends to occur when a circumferential groove is formed near that end. The second cam surface 70 (controlled flare surface) is positioned adjacent to the gear 42 so that it contacts the pipe element near its end where flare would be most pronounced as a result of groove formation. As shown in FIGS. 4 and 6, except for its discontinuity 70a, the second cam surface 70 has a constant radius 72 sized to engage the pipe element to control the flare and, for example, maintain its end at the pipe element's original nominal diameter during and after groove formation. Discontinuity 70a is aligned with the discontinuity 60 in the first cam surface 56 and is a position on the cam body 54 where the cam surface 70 does not contact the pipe element. In alternate embodiments, the second cam surface 70 may have a region of increasing radius and a finishing region of constant radius, or second cam surface 70 may have an increasing radius over its entire arc length.

Figure 2:
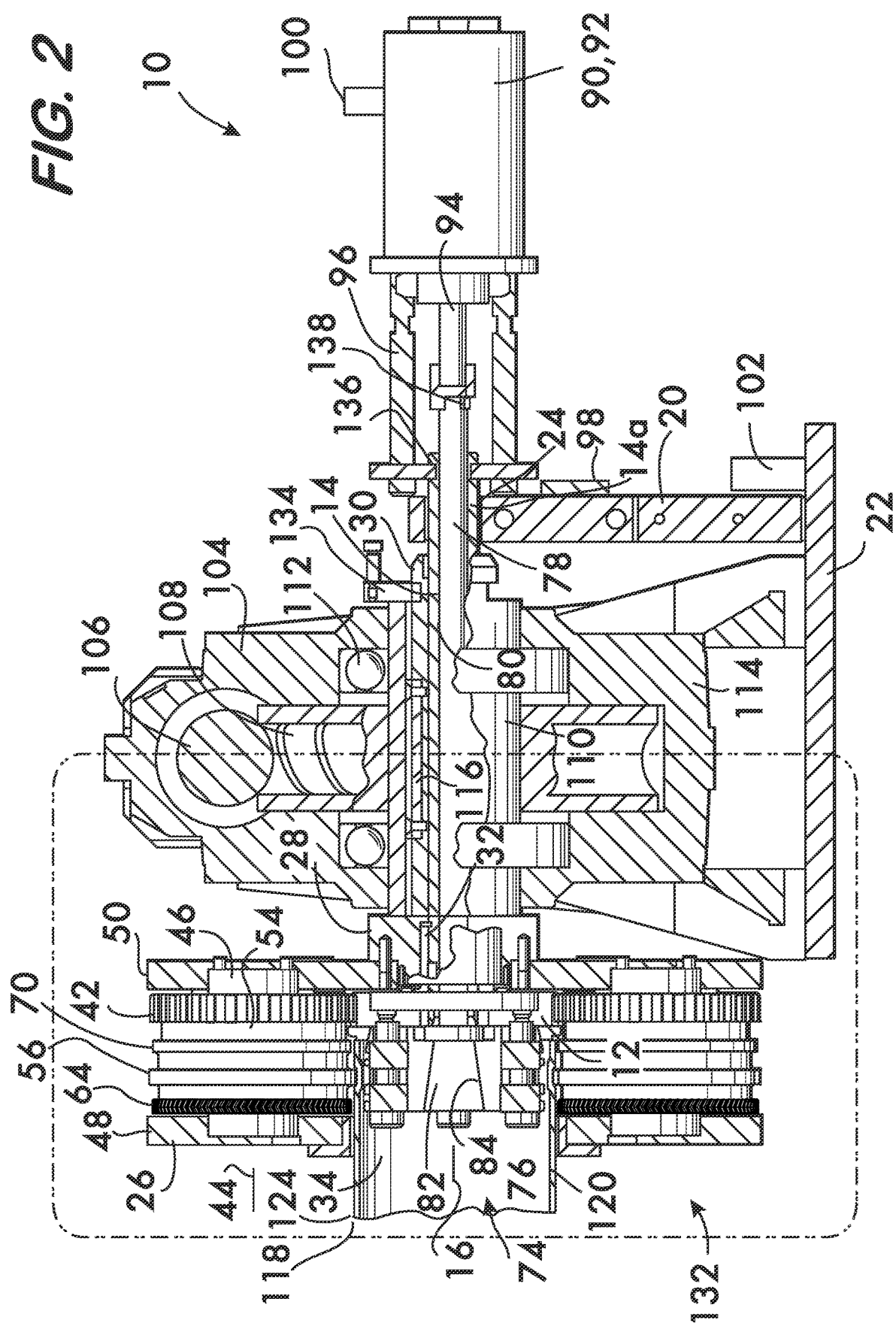
FIG. 2 is a longitudinal sectional view of the device shown in FIG. 1 forming a circumferential groove in a pipe element.
Figure 2A:
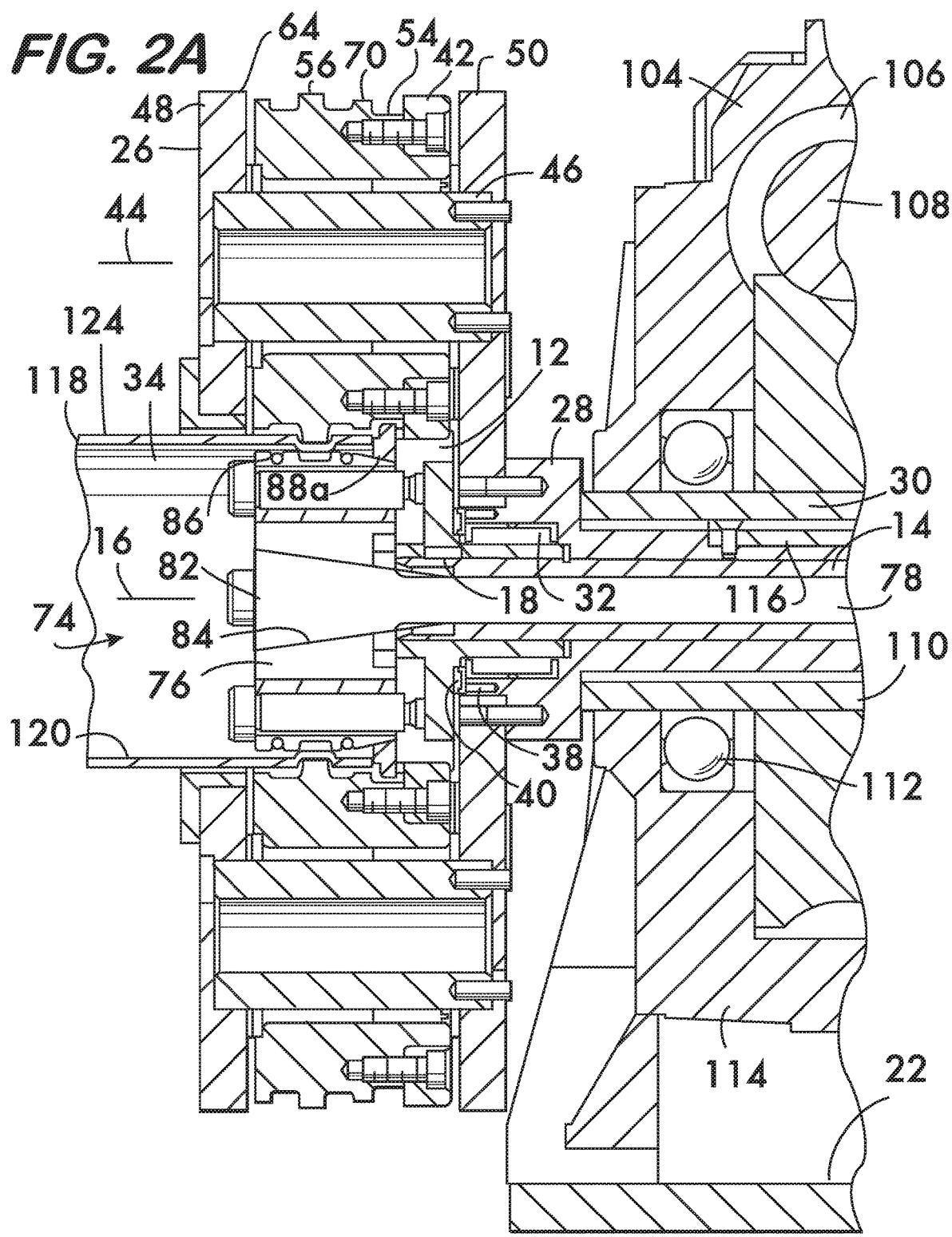
FIG. 2A is a longitudinal sectional view on an enlarged scale of a portion of the device shown in FIG. 2.

As shown in FIGS. 1, 3 and 3A, device 10 further comprises an expanding die 74 positioned adjacent to the pinion 12. In this example die 74 comprises four segments 76 radially slidably mounted on pinion 12 and coupled to an actuator. In this example, the actuator comprises a draw bar 78 which extends through a hollow bore 80 of the intermediate shaft 14. The draw bar 78 has a tapered, faceted end 82 which engages mating facet surfaces 84 on each die segment 76. Draw bar 78 is movable axially within bore 80 relatively to the intermediate shaft 14 and die segments 76 are movable radially toward and away from the pinion axis 16 relatively to the pinion 12. Radial motion of the die segments 76 is effected by axial motion of the draw bar 78. FIGS. 1 and 1A illustrate the draw bar 78 and die segments 76 in the retracted position and FIGS. 2 and 2A illustrate the draw bar and die segments in the expanded position. When the draw bar 78 is extended toward the opening 34 of carriage 26 (FIGS. 1, 1A) the die segments 76 are positioned on the smaller part of the tapered end 82 of the draw bar 78 and the die segments are in their retracted position. Die 74 further comprises circular springs 86 (see FIG. 3A) which surround and bias the die segments 76 into the retracted position. When the draw bar 78 is drawn away from the opening 34 of carriage 26 (FIGS. 2, 2A) the die segments 76, being axially fixed on pinion 12, are forced radially outwardly through interaction between the facet surfaces 84 on each segment 76 and the tapered, faceted end 82 of the draw bar 78. When the draw bar 78 is returned toward the opening 34 of carriage 26, the die segments 76 travel radially inwardly under the influence of circular springs 86 and return to the retracted position.

As further shown in FIGS. 1A and 3A, each die segment 76 has a die face 88 which faces radially away from the pinion axis 16 so as to engage the inner surface of a pipe element received within the carriage 26. Die faces 88 have a profile shape which is coordinated with the shape of the first cam surfaces 56 on the cam bodies 54. As described below, the first cam surfaces 56 and the die faces 88 cooperate to form a circumferential groove of a desired shape in the pipe element (see FIGS. 2, 2A). For pipe elements having a nominal diameter of 1.25 inches or greater it may be advantageous to use the die 74 in conjunction with first cam surfaces 56 to more precisely control the final groove shape and dimensions of the pipe element. Use of the die 74 is expected to produce better defined circumferential grooves than is possible using cam surfaces alone. Note that die faces 88 have a tapered surface 88a (FIGS. 1A, 2A and 3A) which provides free space for the second (controlled flare) cam surfaces 70 to form the end of the pipe element when it is greater than nominal diameter. Surfaces 88a are also useful when controlled flare surfaces 70 are used to reduce the outer diameter of the pipe element.

As shown in FIGS. 1 and 2, the actuator which moves draw bar 78 axially to expand and retract die 74 further comprises a cylinder and piston 90. In this example embodiment, cylinder and piston 90 comprises a double acting pneumatic cylinder 92 having a piston 94 coupled to the draw bar 78. Pneumatic cylinder 92 is mounted on a frame 96 which is attached to the intermediate shaft 14 and is movable relatively to the base 22. Thus, the pneumatic cylinder 92 moves axially with the intermediate shaft 14 but its piston 94 can move the draw bar 78 relatively to the intermediate shaft 14. A position sensor 98 is used to detect the position of the assembly which includes the draw bar 78, the die 74, the pinion 12, the intermediate shaft 14 and the pneumatic cylinder 92 and its frame 96. The position sensor 98 may for example, comprise a proximity sensor or a micro switch. A pressure sensor 100 is used to detect the pressure status of the pneumatic cylinder 92. Both the position sensor 98 and the pressure sensor 100 are in communication with a controller 102, which may comprise, for example a programmable logic controller or other microprocessor. The controller 102 uses information from the position sensor 98 and the pressure sensor 100 to control operation of the device 10 as described below.

Figure 7:
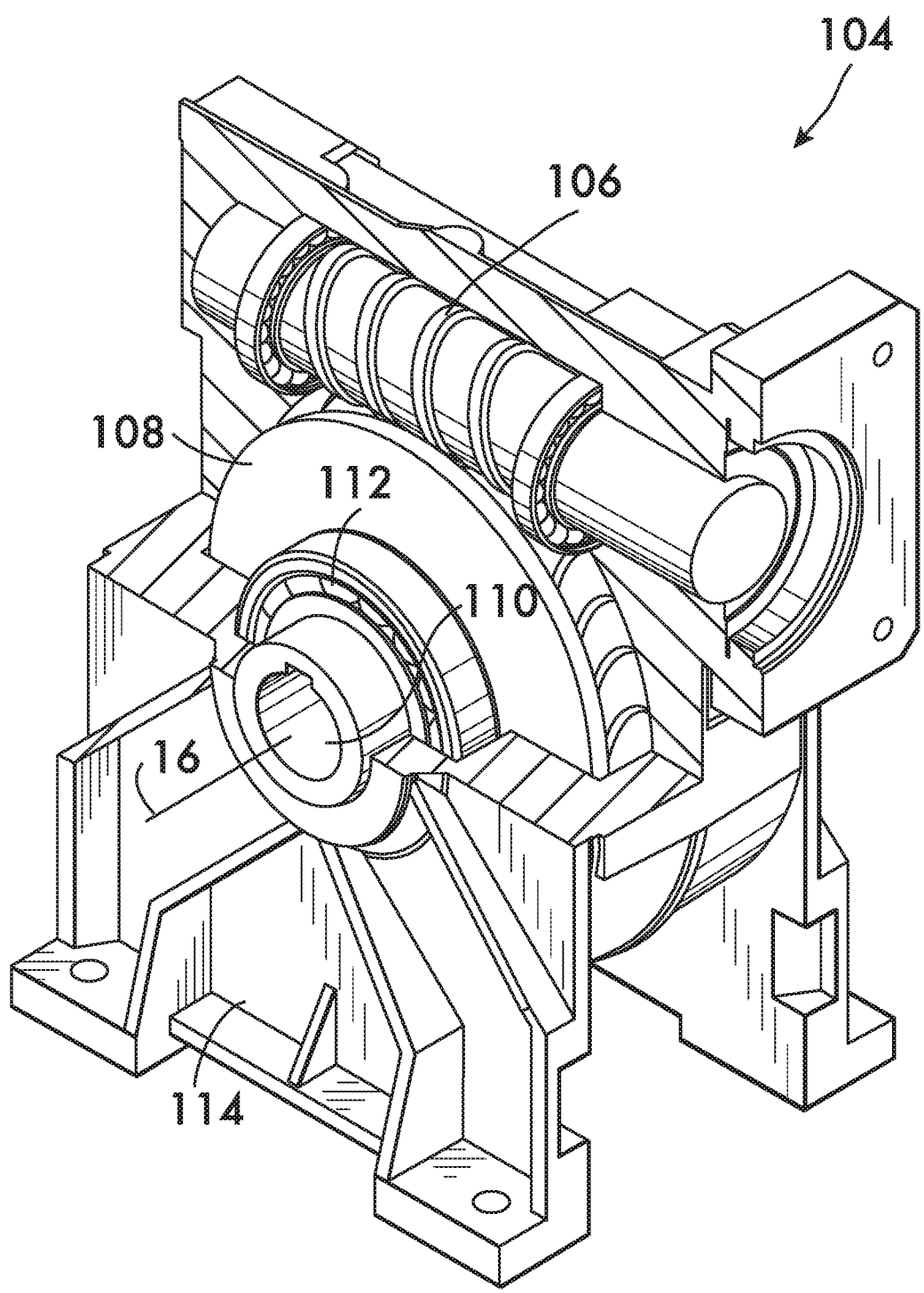
FIG. 7 is an isometric view of a gear reduction assembly used in the device shown in FIG. 1.

As shown in FIGS. 1 and 7, a reducing gear train 104 is used to rotate the outer shaft 30 about the pinion axis 16. In this example embodiment the reducing gear train 104 comprises a worm screw 106 driven by a servo motor (not shown) controlled by controller 102. The servo motor acts as an indexing drive and has an encoder which provides precise information as to the position of the motor shaft, thereby allowing precise control of the rotation of the worm screw 106.

Worm screw 106 meshes with a worm wheel 108. As shown in FIGS. 1 and 7 the worm wheel 108 is mounted on an output shaft 110 supported for rotation about the pinion axis 16 on bearings 112 between the output shaft 110 and a gearbox 114, which is fixed to the base 22. Output shaft 110 is coupled to the outer shaft 30 by a key 116, thus ensuring rotation of the outer shaft 30 when the output shaft 110 is rotated by the worm screw 106 and worm wheel 108.

Figure 8:
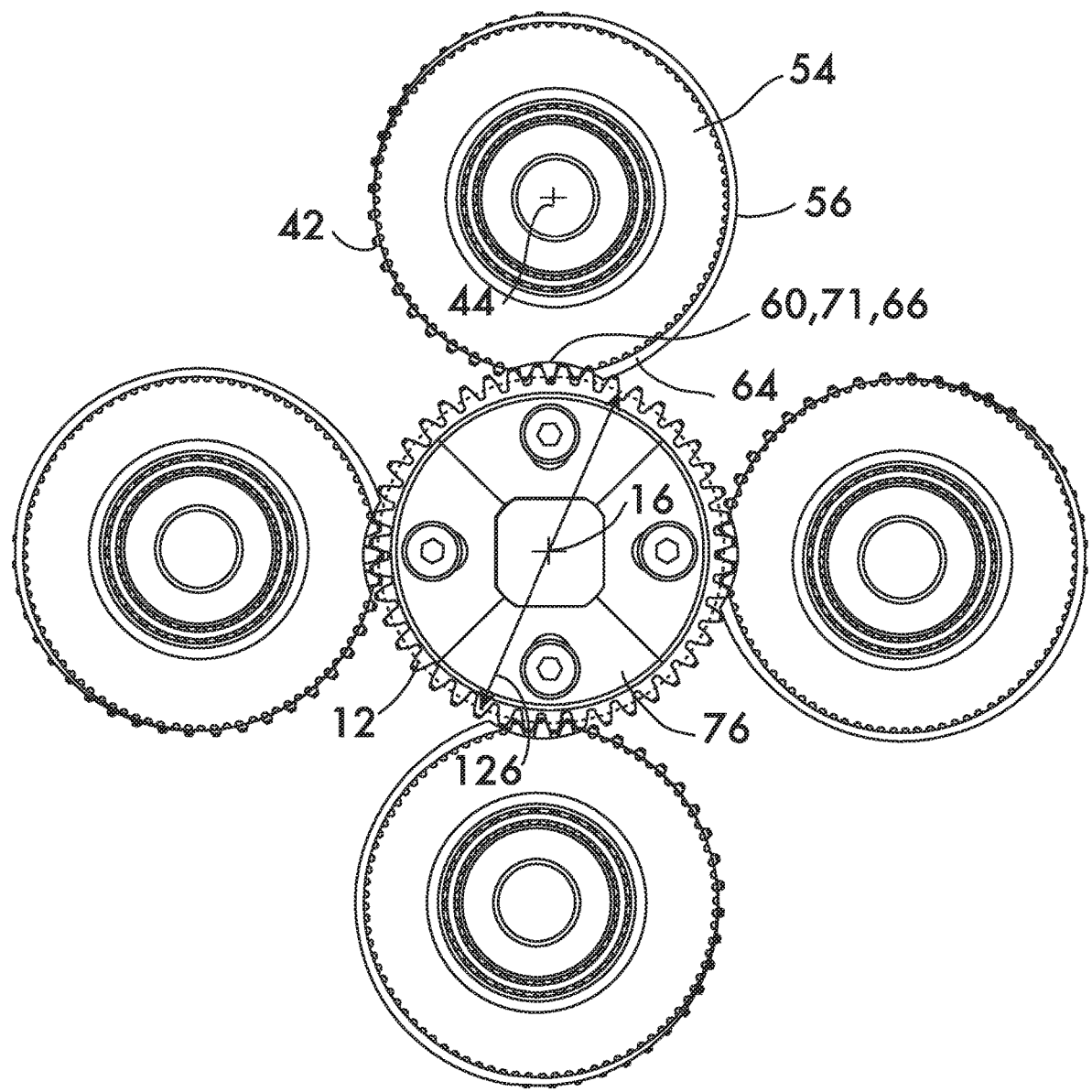
FIG. 8 is an end view of selected components used in the device shown in FIG. 1.

Operation of device 10 begins with the cam bodies 54 positioned as shown in FIG. 8, with the discontinuities 60 and 70*a* in their respective first and second cam surfaces 56 and 70 (not visible) facing the pinion axis 16 and the gaps 66 in their respective traction surfaces 64 (when present) also facing pinion axis 16. This orientation of the cam bodies 54 is established upon assembly of the gears 42 with the pinion 12 in the carriage 26 and is set as the start position by the controller 102 (FIG. 1) and the servo motor (not shown) acting through the worm screw 106 and worm wheel 108. Die segments 76 are in their retracted position (FIG. 1A).

As shown in FIGS. 1 and 1A, with the cam bodies 54 in the start position and the die segments 76 retracted, a pipe element 118 to be grooved is inserted through opening 34 in carriage 26 and against the stop plate 36. The alignment of the gaps 66 in the traction surfaces 64 (when present) and the respective discontinuities 60, 70*a* in the first and second cam surfaces 56, 70 as well as the retracted position of the die segments 76 provide clearance for pipe insertion. The pipe element 118 is further pressed against stop plate 36, compressing the springs 38 and moving the assembly comprising the die 74, the pinion 12, the draw bar 78, thrust bearing 40 and the pneumatic cylinder 92 axially relatively to the base 22 and the fixing mount 20 attached thereto, thereby reaching the positive stop state when thrust bearing 40 abuts flange 28. The position of the assembly is sensed by the position sensor 98 which sends a signal indicative of the assembly position to the controller 102. Upon receipt of the position signal, controller 102 commands the pneumatic cylinder 92 to pull the draw bar 78 away from the opening 34 of the carriage 26. This causes the die segments 76 to move radially outward into an expanded position (FIGS. 2, 2A) and thereby engage the die faces 88 with the inner surface 120 of the pipe element 118. The expanded position of the die segments 76 will vary depending upon the inner diameter of the pipe element. Pneumatic cylinder 92 maintains force on draw bar 78, thereby locking the dies 76 against the pipe element inner surface. When the pressure sensor 100 senses a threshold lower pressure on the retract side of the pneumatic cylinder 92 indicating that the draw bar 78 has been pulled, it sends a signal to the controller 102 indicative of the status of the die segments 76 as expanded. Upon receipt of the die status signal from the pressure sensor 100 the controller 102 commands the servo motor to turn the worm screw 106, which turns the worm wheel 108. In this example rotation of the worm wheel 108 rotates the output shaft 110 counterclockwise (when viewed in FIG. 8) which causes the outer shaft 30 to which it is keyed (key 116, see FIG. 2A) to rotate. Rotation of outer shaft 30 rotates carriage 26 counterclockwise about the pinion axis 16. (The direction of rotation of carriage 26 is predetermined by the arrangement of the first cam surfaces 56 on the cam bodies 54.) This causes the gears 42 and their associated cam bodies 54 to orbit about the pinion axis 16. However, the pinion 12 is fixed against rotation because the intermediate shaft 14 is locked to fixing mount 20 by the interaction between intermediate shaft portion 14*a* and opening 24 of the fixing mount. Because the gears 42 engage the (fixed) pinion 12, relative rotation of the carriage 26 about the pinion axis 16 causes the gears 42, and their associated cam bodies 54, to rotate about their respective gear axes 44 (see FIGS. 2, 2A and 8). Rotation of the cam bodies 54 brings traction surfaces 64 and first cam surfaces 56 into contact with the outer surface 124 of the pipe element 118. The traction surfaces 64 grip the pipe element while the first cam surfaces 56 impress a groove into the pipe element outer surface 124 as the region of increasing radius 58 and the region of constant radius 62 of each first cam surface 56 traverse the pipe element 118. The die segments 76 are engaged and support the inner surface 120 of the pipe element 118 and the die faces 88 cooperate with the first cam surfaces 56 to form the circumferential groove.

The location of the first cam surfaces 56 and the second (controlled flare) cam surfaces 70 on the cam bodes 54 are coordinated with the position of the pipe element 118 received within the carriage 26 so that the groove is formed at the desired distance from the end of the pipe element 118 and the flare at the end of the pipe element is controlled, i.e., limited or reduced to approximately its nominal diameter or smaller. The controller 102 rotates the carriage 26 through as many revolutions as necessary (depending upon the gear ratio between the gears 42 and the pinion 12) to form a circumferential groove of substantially constant depth for pipe elements having uniform wall thickness. In this example embodiment only one revolution of the carriage is necessary to form a complete circumferential groove of constant depth. Upon completion of groove formation the controller 102, acting though the servo motor and gear train 104 returns the carriage 26 to a position where gaps 66 in the traction surfaces 64 and the discontinuities 60 and 70*a* in the first and second cam surfaces 56 and 70 again face the pinion axis 16 (FIG. 8). The controller 102 then commands the pneumatic cylinder 92 to move the draw bar 78 toward the opening 34 and allow the die segments 76 to move radially inward to their retracted position and disengage from the pipe element 118 under the biasing force of the circular springs 86 (FIGS. 1 and 3A). This position of the cam bodies 54 and die 74 allows the pipe element 118 to be withdrawn from the carriage 26. As the pipe element 118 is withdrawn, springs 38 push the assembly comprising the draw bar 78, pinion 12, thrust bearing 40, intermediate shaft 14, pneumatic cylinder 92 and die 74 back to its initial position and device 10 is again ready to groove another pipe element.

Significant advantage is achieved with the device 10 because it applies minimal torque to the pipe element during the grooving process while forming a groove to a fixed diameter. As shown in FIGS. 8 and 5, this condition is achieved when: 1) the pitch circle diameter 126 of pinion 12 is substantially equal to the outer diameter of the pipe element (FIG. 8); and, 2) the pitch circle diameter 128 of the traction surfaces 64 is substantially equal to the pitch circle diameter 130 of the gears 42 (FIG. 5). When these two conditions are met, the traction surfaces 64 are constrained to traverse the outer surface of the pipe element with little or no tendency to cause the pipe to rotate, and thus apply only minimal torque to the pipe element. The terms "equal" and "substantially equal" as used herein to refer to the relationship between the pitch circle diameters of pinions, gears and the traction surfaces and the outer diameter of the pipe element means that the pitch circle diameter of the pinion is close enough to the outer diameter of the pipe element and the pitch circle diameter of the traction surface is close enough to the pitch circle diameter of the gears such that minimal torque is applied to the pipe element. The pitch circle diameter of the pinion may be considered "equal to" or "substantially equal to" the outer diameter of the pipe element for practical purposes if the difference between these values is on the order of hundredths of an inch. Because practical pipes have significant diametral tolerances from nominal, it is expected that the relationship between the pitch circle diameter of the traction surfaces and the outer diameter of the pipe element may be affected by pipe diameter deviation such that torque will be applied to the pipe element, thereby making the use of an external clamp advantageous in those cases. In device 10, die 74 may act as a clamp as it is mounted on the pinion 12, which is fixed in rotation.

In a practical example design, a device 10 suitable for grooving pipe elements having a nominal pipe size of 2.5 inches uses four gears 42 and cam bodies 54 as shown. The outer diameter of 2.5 inch nominal pipe is 2.875 inches. A pinion 12 having 36 teeth and a pitch circle diameter of 72 mm (2.835 inches) is close enough (a difference of 0.040 inches) such that minimal torque is applied when the pitch circle diameters of the gears and the pitch circle diameter of the traction surfaces are also substantially equal to one another. This example embodiment uses gears 42 having 36 teeth with a pitch circle diameter of 72 mm (2.835 inches). The traction surfaces 64, when knurled or otherwise prepared, although not a gear, have a substantially equivalent pitch diameter (i.e., the diameter of a cylinder which gives the same motion as an actual gear), which is impressed into the pipe as it is traversed by the traction surface. Differences between the pitch circle diameter of the traction surfaces and the pitch circle diameter of the gears on the order of hundredths of an inch fulfill this definition of "equal" or "equivalent" in practical applications. Considering the gear ratio between the pinion 12 and the gears 42 are equal in this example, it is clear that the carriage 26 will make one revolution to form a complete circumferential groove about the pipe element.

In another example design suitable for 4 inch nominal size pipe having an outer diameter of 4.5 inches, a pinion having 72 teeth with a pitch circle diameter of 4.5 inches is feasible. This design uses 4 gears, each gear having 72 teeth and a pitch circle diameter of 4.5 inches. The 1:1 ratio between pinion and gear indicate a single carriage revolution is required to form a complete groove. Other ratios between pinion and gear will result in multiple or partial carriage revolutions to form a complete groove.

Device 10 is designed such that the carriage 26 and its associated gears 42, cam bodies 54, pinion 12, outer shaft 30, intermediate shaft 14 and die 74 along with other related components constitute an assembly 132 interchangeable with the gear train 104 to permit the device to be readily adapted to groove a range of pipes having different diameters and wall thicknesses. Interchangeability is afforded by the use of a removable clip 134 to secure the outer shaft 30 to the gear box 114 and the key 116 between the outer shaft 30 and the output shaft 110 of worm wheel 108 as well as attaching the intermediate shaft 14 to the frame 96 of the pneumatic cylinder 92 by engaging the frame with slots 136 in the intermediate shaft and attaching the piston 94 to the draw bar 78 also using mutually engaging slots and shoulders 138. The assembly 132 can be removed by lifting the pneumatic cylinder 92 so that the frame 96 disengages from the intermediate shaft 14 and the piston 94 disengages from the draw bar 78, and then removing the retaining clip 34 (thereby allowing the outer shaft 30 to disengage from the worm wheel 108) and sliding the assembly along the pinion axis 16. A different carriage assembly, suitable for grooving a different pipe element, may then be substituted.

Devices 10 according to the invention are expected to increase the efficiency of pipe grooving operations because they will operate rapidly and accurately on a wide range of pipe element sizes and schedules without the need for stands to both support the pipe element and accommodate its rotation and ensure alignment. Device 10 will also permit bent pipe elements and pipe assemblies having elbow joints to be grooved without concern for rotation of the transverse pipe element's motion.

Figure 9:
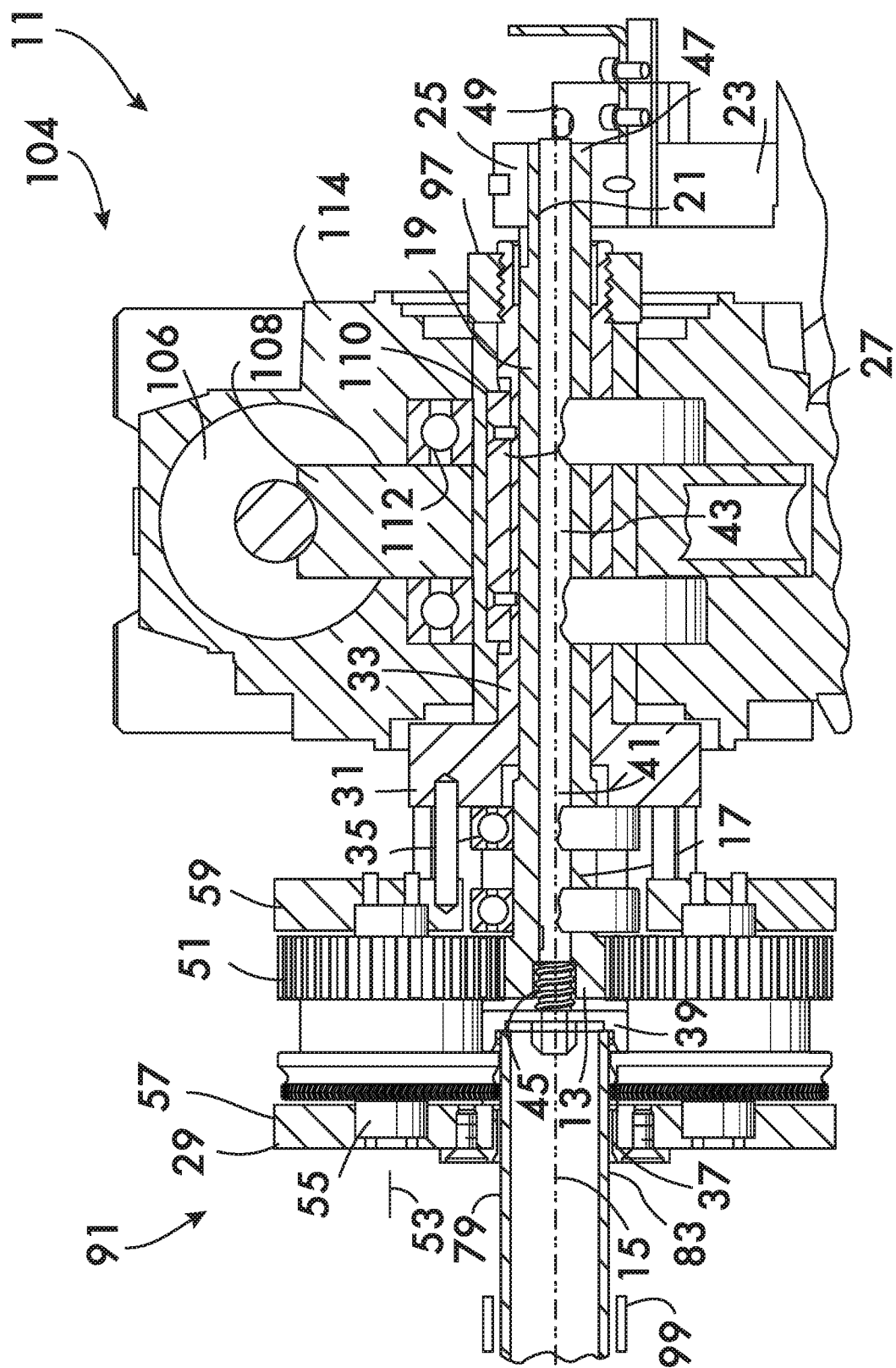
FIG. 9 is a longitudinal sectional view of an example device for forming circumferential grooves in pipe elements.
Figure 9A:
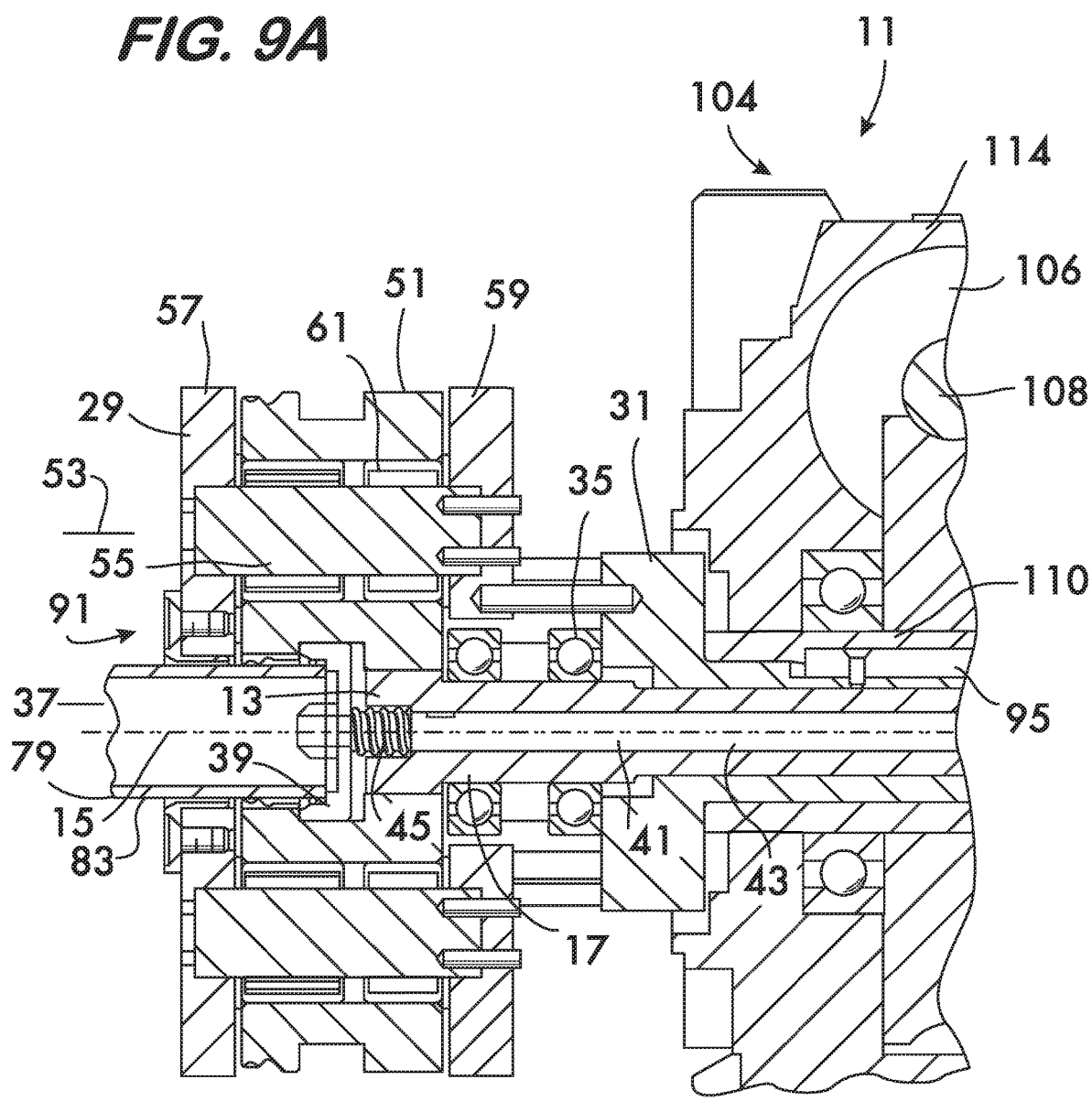
FIG. 9A is a longitudinal sectional view on an enlarged scale of a portion of the device shown in FIG. 9.
Figure 10A:
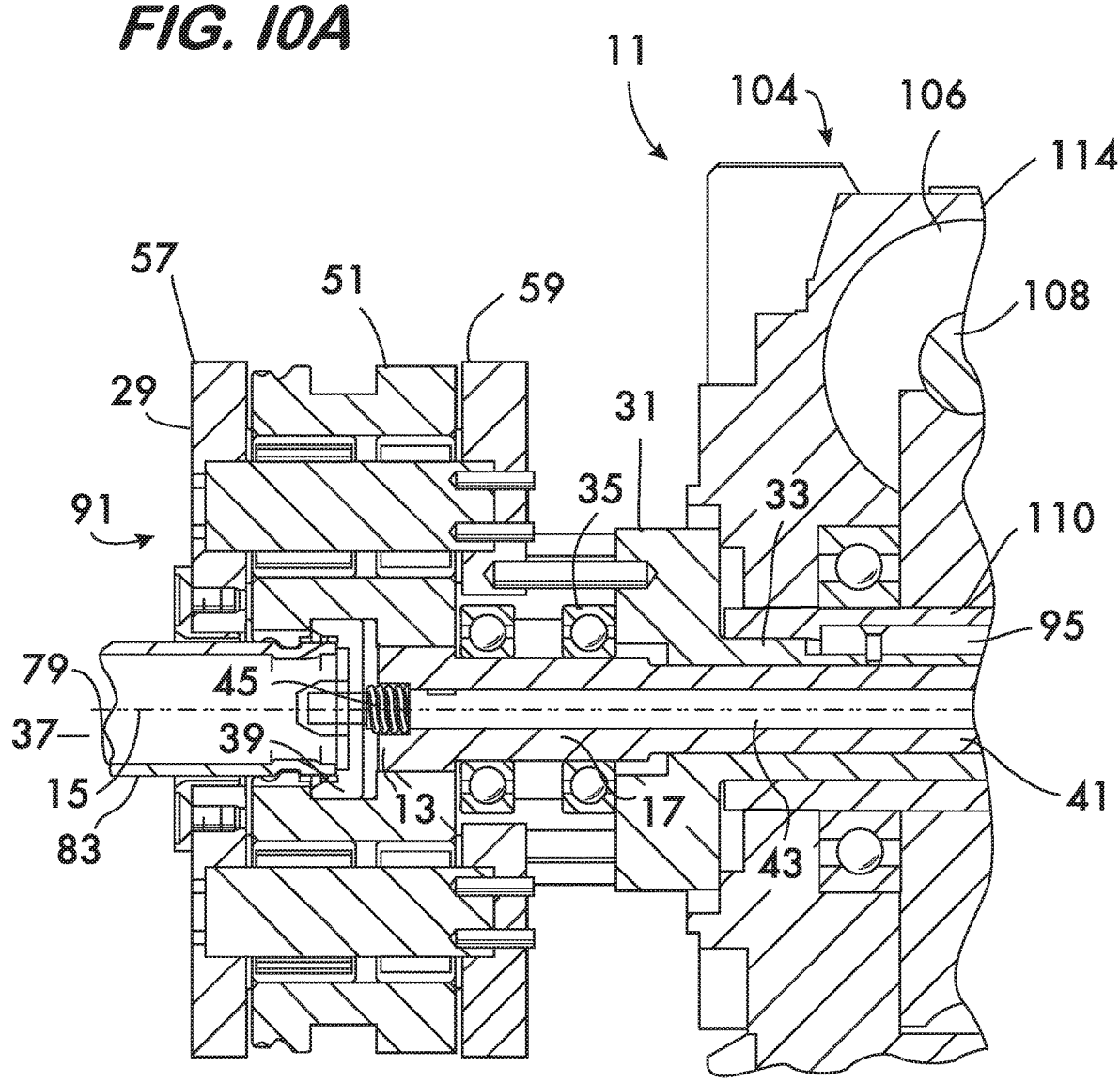
FIG. 10A is a longitudinal sectional view on an enlarged scale of a portion of the device shown in FIG. 10.

FIG. 9 shows another device 11 for forming a circumferential groove in a pipe element. Device 11 comprises a pinion 13 fixedly mounted against rotation about a pinion axis 15 arranged coaxially with the pinion. Rotational fixity of the pinion 13 is accomplished by mounting it on one end 17 of a pinion shaft 19, the opposite end 21 of the pinion shaft being fixed to a post 23 by a key 25. The post is mounted on a base 27.

A carriage 29 surrounds the pinion 13. Carriage 29 is mounted on the flange 31 of a drive shaft 33. Drive shaft 33 is hollow, surrounds and is coaxial with the pinion shaft 19. Bearings 35 positioned between the drive shaft 33 and the pinion shaft 19 permit the drive shaft, and hence the carriage 29 attached thereto, to rotate about the pinion axis 15. The carriage 29 defines an opening 37 for receiving a pipe element in which a groove is to be formed. Opening 37 is arranged coaxially with the pinion axis 15. As shown in FIGS. 9 and 11, a cup 39 is mounted coaxially with the pinion 13. The pipe element abuts the cup 39, and in this example is mounted on a cup shaft 41 which extends coaxially through a bore 43 in the hollow pinion shaft 19. Cup shaft 41 is movable axially along pinion axis 15 and is biased toward the opening 37 by a spring 45 acting between the pinion shaft 19 and the cup 39. The end 47 of the cup shaft 41 opposite to cup 39 is used in conjunction with a switch 49 mounted adjacent to the post 23 to activate the device as described below. In this example embodiment the switch comprises a proximity sensor, but could also be a contact switch, such as a micro-switch.

A plurality of gears 51 are mounted on the carriage 29. In the example embodiment shown in FIGS. 9 and 11, the carriage has 3 gears 51 spaced at angles of 120° from one another. Each gear 51 is rotatable about a respective gear axis 53. In a practical embodiment, each gear is mounted on a gear shaft 55 fixed between front and rear plates 57 and 59 comprising the carriage 29. Bearings 61 positioned between each gear 51 and its respective shaft 55 provide for low friction rotation of the gears within the carriage 29. Each gear 51 engages with the pinion 13.

Figure 12:
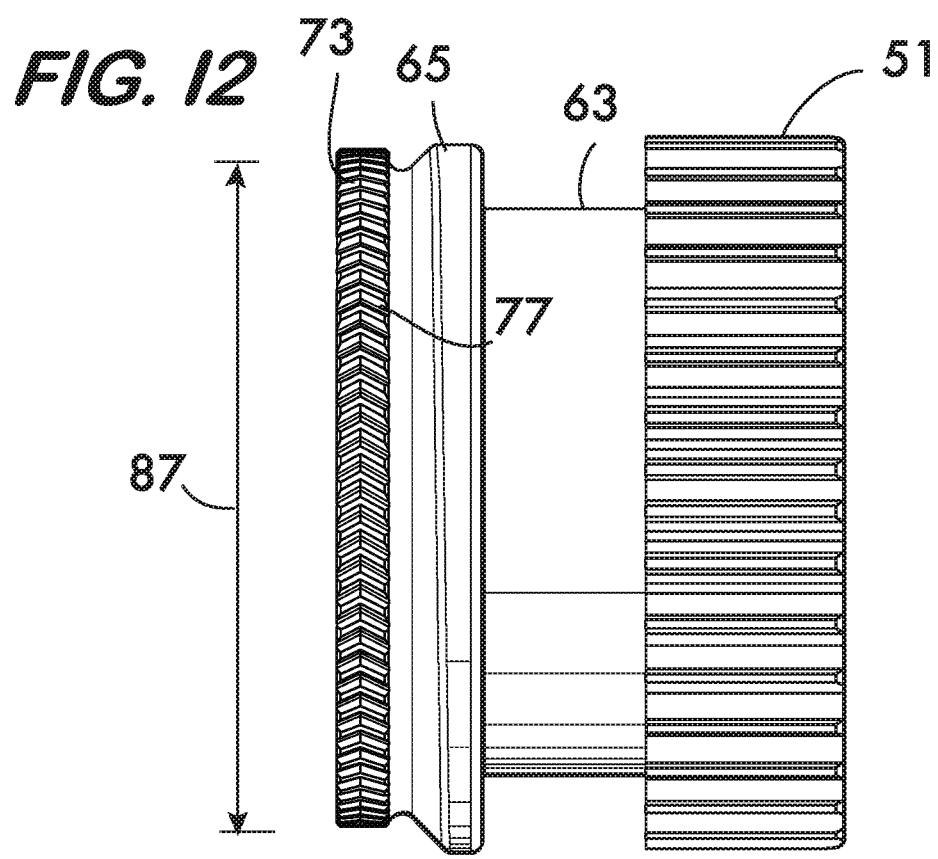
FIG. 12 is a side view of an example cam used in the device shown in FIG. 9 on an enlarged scale.
Figure 13:
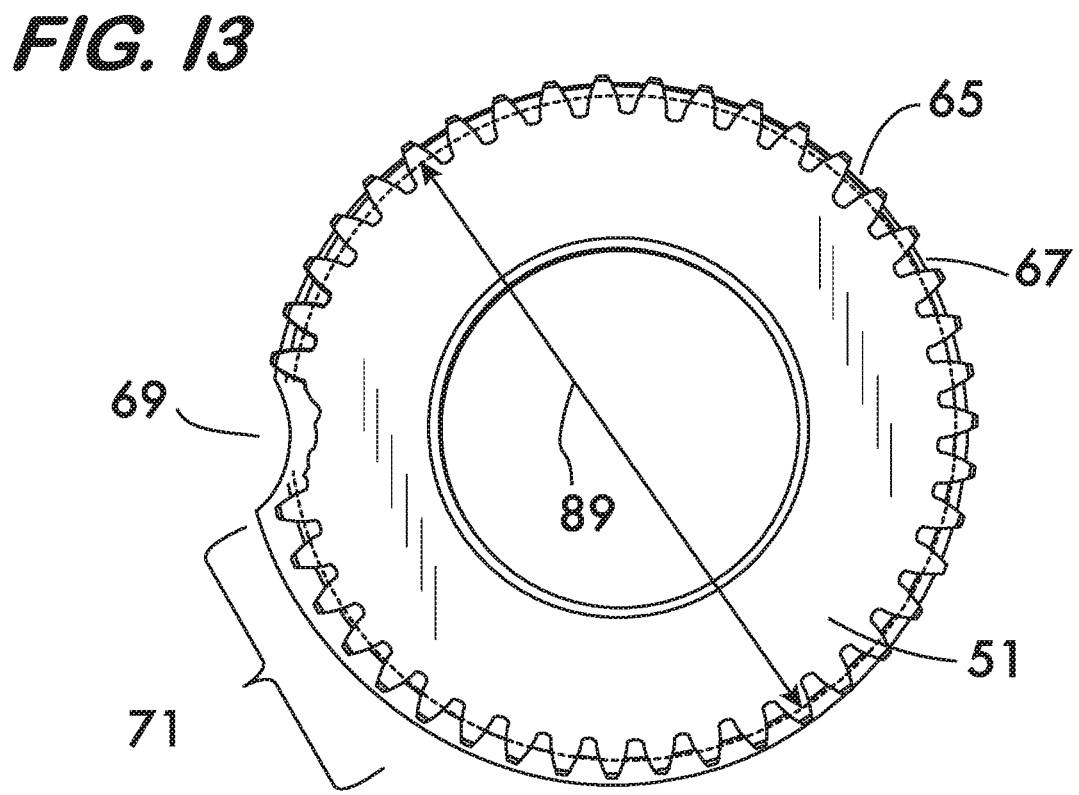
FIG. 13 is an end view of an example cam used in the device shown in FIG. 9 on an enlarged scale.

As shown in FIG. 12, a respective cam body 63 is mounted on each gear 51. A respective cam surface 65 extends around each cam body 63. Cam surfaces 65 are engageable with the pipe element received through the opening 37 and abutting the cup 39. As shown in FIG. 13, each cam surface 65 comprises a region of increasing radius 67 and a discontinuity 69 of the cam surface. Discontinuity 69 is a position on the cam body 63 where the cam surface 65 does not contact the pipe element. It is further advantageous to include, as part of each cam surface 65, a region of constant radius 71 positioned adjacent to the discontinuity 69. A traction surface 73 (see FIG. 12) extends around at least one of the cam bodies 63. In the example shown in FIG. 11, a respective traction surface 73 extends around each cam body 63. The traction surfaces 73 are also engageable with a pipe element received within the carriage 29, but each traction surface has a gap 75 aligned axially (i.e., in a direction along the gear axis 53) with the discontinuity 69 in the cam surface 65 on each cam body 63. As shown in FIG. 12, the traction surface 73 may comprise a plurality of projections 77 extending outwardly therefrom. The projections provide additional purchase between the pipe element and the traction surface 73 during device operation and may be formed, for example, by knurling the traction surface. The traction surface has pitch circle with a diameter 87. When projections 68 are present on traction surface 64, pitch diameter 87 of the traction surface will be determined by the interaction of projections 87 with pipe element 79, including the impression made by the projections 87 upon pipe element 79. If projections 68 are not present, the pitch circle diameter 87 of the traction surface 64 will equal that of the traction surface. As further shown in FIG. 12, the cam surface 65 is positioned between the gear 51 and the traction surface 73, in spaced relation to the traction surface but proximate to it as compared with the gear.

As shown in FIGS. 9 and 7, a reducing gear train 104 is used to rotate the drive shaft 33 about the pinion axis 15. In this example embodiment the reducing gear train 104 comprises a worm screw 106 driven by a servo motor (not shown) controlled by a microprocessor, such as a programmable logic controller (not shown). The servo motor acts as an indexing drive and has an encoder which provides precise information as to the position of the motor shaft, thereby allowing precise control of the rotation of the worm screw 106.

Worm screw 106 meshes with a worm wheel 108. The worm wheel 108 is mounted on a hollow output shaft 110 supported for rotation about the pinion axis 15 on bearings 112 between the output shaft 110 and a gearbox 114. Output shaft 110 is coupled to the drive shaft 33 by a key 95, thus ensuring rotation of the drive shaft 33 when the output shaft 110 is rotated by the worm screw 106 and worm wheel 108.

Figure 14:
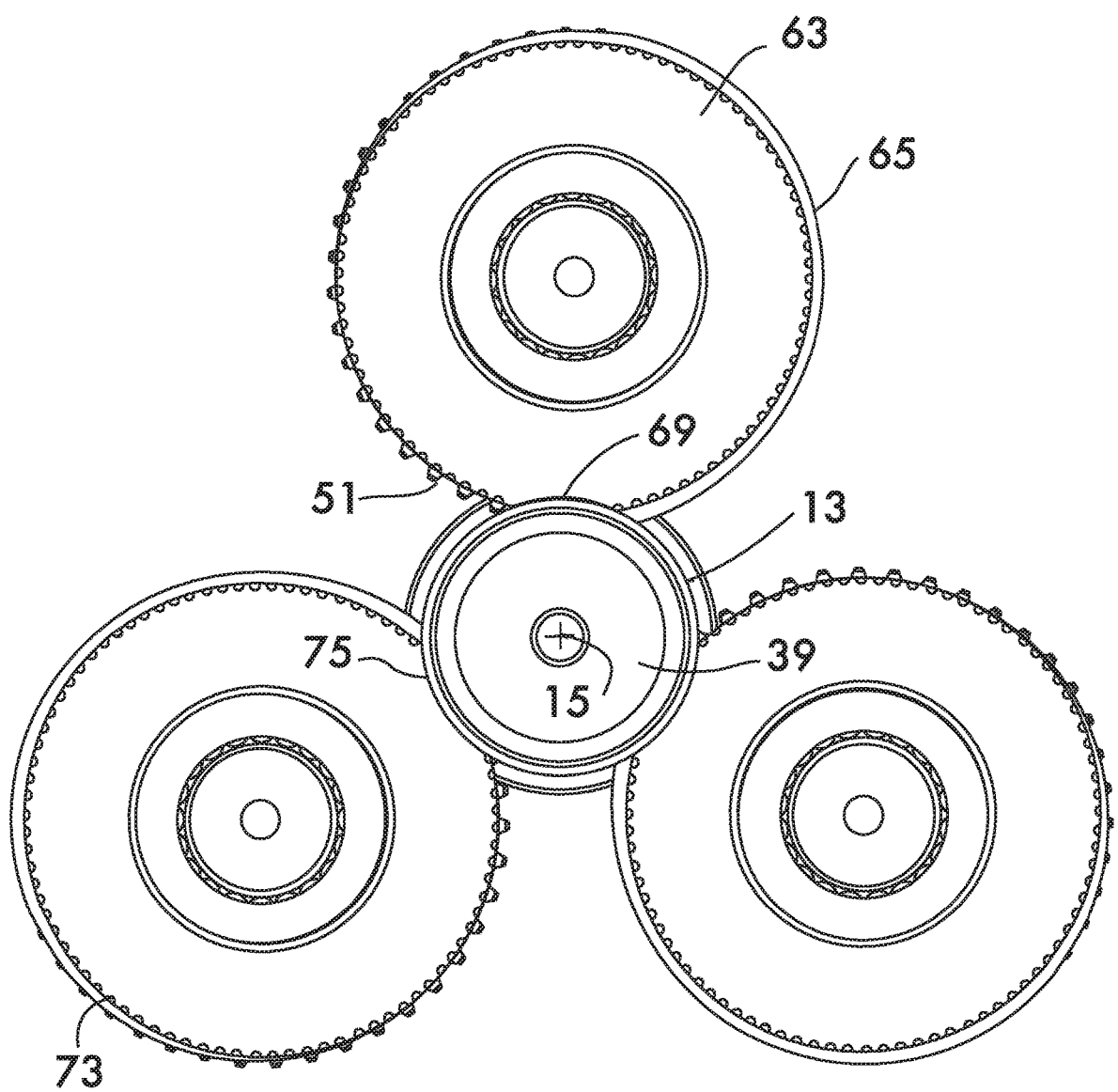
FIG. 14 is an end view of selected components used in the device shown in FIG. 9.

Operation of device 11 begins with the cam bodies 63 positioned as shown in FIG. 14 with the discontinuities 69 in their respective cam surfaces 65 facing the pinion axis 15 and the gaps 75 (see FIG. 11) in their respective traction surfaces 73 also facing pinion axis 15. This orientation of the cam bodies 63 is established upon assembly of the gears 51 with the pinion 13 in the carriage 29 and is set as the start position by the control system and the servo motor (not shown) acting through the worm screw 106 and worm wheel 108.

With the cam bodies 63 in the start position shown in FIG. 14 a pipe element 79 to be grooved is inserted through opening 37 in carriage 29 and abutting the cup 39 (see FIG. 9). The alignment of the gaps 75 in the traction surfaces 73 and the discontinuities 69 in the cam surfaces 63 (see FIG. 11) provide clearance for pipe insertion. The pipe element is further pressed against cup 39, compressing the spring 45 and moving the cup 39 against a positive stop (the face of the pinion shaft 19 in this example) such that an end 47 of the cup shaft 41 interacts with the switch 49, in this example, a proximity switch. Closing switch 49 sends a signal to the control system which commands the servo motor to turn the worm screw 106, which turns the worm wheel 108. In this example rotation of the worm wheel 108 rotates the output shaft 110 counterclockwise (when viewed in FIG. 14) which causes the drive shaft 33 to which it is keyed (key 95) to rotate. Rotation of drive shaft 33 rotates carriage 29 counterclockwise about the pinion axis 15. (The direction of rotation of carriage 29 is determined by the arrangement of the cam surfaces 65 on the cam bodies 63.) This causes the gears 51 and their associated cam bodies 63 to orbit about the pinion axis 15. However, the pinion 13 is fixed against rotation because the pinion shaft 19 is keyed to post 23 by key 25. Because the gears 51 engage pinion 13 the relative rotation of the carriage 29 about the pinion axis 15 causes the gears 51, and their associated cam bodies 63, to rotate about their respective gear axes 53. Rotation of the cam bodies 63 brings traction surfaces 73 and cam surfaces 65 into contact with the outer surface 83 of the pipe element 79. The traction surfaces 73 grip the pipe element 79 while the cam surfaces 65 impress a groove into its outer surface 83 as the region of increasing radius 67 and the region of constant radius 71 of each cam surface 65 traverse the pipe element. The location of the cam surfaces 65 on the cam bodes 63 is coordinated with the position of the pipe element when it is inserted enough so as to reach a positive stop and trip the switch 49 so that the groove is formed at the desired distance from the end of the pipe element. The controller rotates the carriage 29 through as many revolutions as necessary (depending upon the gear ratio between the gears 51 and the pinion 13) to form a circumferential groove of substantially constant depth in the pipe element. Upon completion of groove formation the controller returns the carriage 29 to a position where gaps 75 in the traction surfaces 73 and the discontinuities 69 in the cam surfaces 65 again face the pinion axis 15 (see FIG. 14). This position of the cam bodies 63 allows the pipe element 79 to be withdrawn from the carriage 29, and device 11 is ready to groove another pipe element.

Significant advantage is achieved with the device 11 because it applies minimal torque to the pipe element during the grooving process while forming a groove to a fixed diameter. This condition is achieved when: 1) the pitch circle diameter 85 of pinion 13 (FIG. 11) is equal to the outer diameter of the pipe element 79; and 2) the pitch circle diameter 87 of the traction surfaces 73 is equal to the pitch circle diameter 89 of the gears 51 (FIG. 12). When these two conditions are met, the traction surfaces 73 are constrained to traverse the outer surface of the pipe element with little or no tendency to cause the pipe to rotate, and thus apply only minimal torque to the pipe element. The term "equal" as used herein to refer to the relationship between the pitch circle diameter of the pinion and the outer diameter of the pipe means that the pitch circle diameter is close enough to the outer diameter such that minimal torque is applied to the pipe element. Differences between the pitch circle diameter and the outer diameter of the pipe element on the order of hundredths of an inch fulfill this definition of "equal" in practical applications. Because practical pipe elements have significant diametral tolerances from nominal, it is expected that the relationship between the pitch circle diameter of the traction surface and the outer diameter of the pipe element may be affected by pipe diameter deviation such that torque will be applied to the pipe element, thereby making the use of an external clamp 99 advantageous (see FIG. 9) in these cases.

In a practical example design, a device 11 suitable for grooving 1 inch nominal diameter pipe uses three gears 51 and cam bodies 63 as shown. The outer diameter of 1 inch nominal pipe is 1.315 inches. A pinion 13 having 21 teeth and a pitch circle diameter of 1 5/16 inches (1.3125 inches) is close enough (a difference of 0.0025 inches) such that minimal torque is applied when the pitch circle diameters of the gears and the traction surfaces are also equal to one another. This example embodiment uses gears 51 having 42 teeth with a pitch circle diameter of 2 5/8 inches. The traction surfaces 73, when knurled or otherwise prepared, although not a gear, have an equivalent pitch diameter (i.e., the diameter of a cylinder which gives the same motion as an actual gear), which is impressed into the pipe as it is traversed by the traction surface. Differences between the pitch circle diameter of the traction surfaces and the pitch circle diameter of the gears on the order of hundredths of an inch fulfill this definition of "equal" or "equivalent" in practical applications. Considering the gear ratio between the pinion 13 and the gears 51 in this example, it is clear that the carriage 29 will make two revolutions to form a complete circumferential groove about the pipe element.

In another example design suitable for 2 inch nominal pipe having an outer diameter of 2⅜ inches (2.375 inches), a pinion having 30 teeth with a pitch circle diameter of 2.362 inches is feasible (a difference of 0.013 inches). This design uses 5 gears, each gear having 30 teeth and a pitch circle diameter of 2.362 inches. The 1:1 ratio between pinion and gear indicate a single carriage revolution is required to form a complete groove. Designs with more than three gears are advantageous when pipe elements having thin walls or larger diameters are being grooved because such pipes have a tendency to bulge elastically over regions between the cams when compressed between three cam surfaces 120° apart from one another. This elastic behavior leads to greater spring back of the pipe elements to their nominal shape and inhibits groove formation. However, more gears mean more cams applying force at more points around the pipe element to better support the pipe element and therefore significantly reduce elastic bulging. More constraints more closely spaced around the pipe element force the deformation largely into the plastic regime where spring back is reduced and compensated for.

Another example design uses 4 gears and cams for pipe elements of 1.25 and 1.5 inch nominal diameter. Gear to pinion ratios of 1.5:1 and 1:1 are also feasible for this design.

Device 11 is designed such that the carriage 29 and its associated gears 51, cam bodies 63, pinion 13, cup shaft 41, cup 39, spring 45, drive shaft 33 and pinion shaft 19 constitute an assembly 91 interchangeable with the gear train 104 to permit the device to be readily adapted to groove a range of pipes having different diameters and wall thicknesses. Interchangeability is afforded by the use of key 25 between the pinion shaft 19 and the post 23, and the key 95 between the drive shaft 33 and the output shaft 110, coupled with a retaining nut 97 threaded with the drive shaft 33 and acting against the output shaft 110. The assembly 91 can be removed by sliding it along the pinion axis 15 when the retaining nut 97 is out of threaded engagement with drive shaft 33. A different carriage assembly, suitable for grooving a different pipe element, may then be substituted.

Devices 11 according to the invention are expected to increase the efficiency of pipe grooving operations because they will operate rapidly, accurately and safely on a wide range of pipe element sizes and schedules without the need for stands to support the pipe element and accommodate its rotation and ensure alignment. Device 11 will also permit pipe assemblies having elbow joints to be grooved without concern for rotation of the transverse pipe element's motion.

What is claimed is:

1. A device for forming a circumferential groove in a pipe element, said device comprising:
    a pinion fixed against rotation about a pinion axis arranged coaxially with said pinion;
    a carriage surrounding said pinion, said carriage being rotatable about said pinion axis and defining an opening arranged coaxially with said pinion axis for receiving said pipe element;
    a plurality of gears mounted on said carriage, each said gear being rotatable relatively to said carriage about a respective gear axis, each said gear engaging with said pinion;
    a plurality of cam bodies, each said cam body mounted on a respective one of said gears;
    a plurality of first cam surfaces, each one of said first cam surfaces extending around a respective one of said cam bodies and engageable with said pipe element received within said opening, each one of said first cam surfaces comprising a region of increasing radius, each one of said first cam surfaces comprising a first discontinuity of said first cam surface.

2. The device according to claim 1, wherein each said gear has a same pitch circle diameter.

3. The device according to claim 1, further comprising a plurality of second cam surfaces, each one of said second cam surfaces extending around a respective one of said cam bodies and positioned in spaced relation to one of said first cam surfaces.

4. The device according to claim 3, wherein each one of said second cam surfaces comprising a second region of increasing radius, each one of said second cam surfaces comprising a second discontinuity of said second cam surface, said second discontinuity being aligned with said first discontinuity on each said cam body.

5. The device according to claim 1, wherein each one of said first cam surfaces comprises a region of constant radius positioned adjacent to a respective one of said first discontinuities.

6. The device according to claim 4, wherein each one of said second cam surfaces comprises a region of constant radius positioned adjacent to a respective one of said second discontinuities.

7. The device according to claim 3, wherein each one of said second cam surfaces has a constant radius.

8. The device according to claim 1, further comprising at least one traction surface extending around one of said cam bodies, said at least one traction surface having a gap therein, said gap being aligned axially with said first discontinuity of said first cam surface surrounding said one cam body.

9. The device according to claim 8, wherein said at least one traction surface comprises a plurality of projections extending outwardly therefrom.

10. The device according to claim 8, wherein said at least one traction surface is positioned proximate to said first cam surface surrounding said one cam body.

11. The device according to claim 8, wherein said pinion has a pitch circle diameter equal to an outer diameter of said pipe element.

12. The device according to claim 11, wherein said at least one traction surface has a pitch circle diameter equal to a pitch circle diameter of one of said gears.

13. The device according to claim 11, further comprising a plurality of said traction surfaces, each one of said traction surfaces extending around a respective one of said cam bodies, each one of said traction surfaces having a gap therein, each said gap being aligned axially with a respective one of said discontinuities of said first cam surfaces on each one of said cam bodies, each one of said traction surfaces having a pitch circle diameter equal to said pitch circle diameters of said gears.

14. The device according to claim 3, further comprising at least one traction surface extending around one of said cam bodies, said at least one traction surface having a gap therein, said gap being aligned axially with said first discontinuity of said first cam surface surrounding said one cam body.

15. The device according to claim 14, wherein said pinion has a pitch circle diameter equal to an outer diameter of said pipe element.

16. The device according to claim 15, wherein said at least one traction surface has a pitch circle diameter equal to a pitch circle diameter of one of said gears.

17. The device according to claim 14, wherein said first cam surface is positioned between said at least one traction surface and said second cam surface surrounding said one cam body.

18. The device according to claim 14, wherein said first and second cam surfaces are positioned between said at least one traction surface and said gear on which said one cam body is mounted.

19. The device according to claim 15, further comprising a plurality of said traction surfaces, each one of said traction surfaces extending around a respective one of said cam bodies, each one of said traction surfaces having a gap therein, each said gap being aligned axially with a respective one of said discontinuities of said first cam surfaces on each one of said cam bodies, each one of said traction surfaces having a pitch circle diameter equal to said pitch circle diameters of said gears.

20. The device according to claim 19, wherein each one of said first cam surfaces is positioned between a respective one of said traction surfaces and a respective one of said second cam surfaces on each said cam body.

21. The device according to claim 19, wherein each one of said first and second cam surfaces is positioned between said respective one of said traction surface and a respective one of said gears on each said cam body.

22. The device according to claim 19, wherein each one of said first cam surfaces is positioned proximate to a respective one of said traction surfaces on each said cam body.

23. The device according to claim 1, comprising at least three said gears.

24. The device according to claim 1, comprising at least four said gears.

25. The device according to claim 1, further comprising a cup positioned adjacent to said pinion and facing said opening, said pipe element abutting said cup.

* * * * *